US010417933B1

(12) United States Patent
Yu et al.

(10) Patent No.: US 10,417,933 B1
(45) Date of Patent: Sep. 17, 2019

(54) SELECTIVE DISPLAY OF COMPREHENSION GUIDES

(71) Applicant: Amazon Technologies, Inc., Reno, NV (US)

(72) Inventors: Wainwright Gregory Siady Yu, Seattle, WA (US); Joon Hao Chuah, Seattle, WA (US); Gregory Nicholas Hullender, Seattle, WA (US); James Joseph Poulin, Seattle, WA (US); Mohammad Kanso, Seattle, WA (US); Manigandan Natarajan, Bellevue, WA (US); Brandon LaBranche Watson, Woodinville, WA (US); Robert Wayne Roth, Renton, WA (US); Joseph King, Seattle, WA (US); Nikunj Aggarwal, Seattle, WA (US); Ramya Dass, Chennai (IN); Sridhar Sampath, Chennai (IN); Santosh Kumar Asokan, Chennai (IN)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 14/262,680

(22) Filed: Apr. 25, 2014

(51) Int. Cl.
*G09B 17/00* (2006.01)
*G09B 19/06* (2006.01)

(52) U.S. Cl.
CPC ........... *G09B 19/06* (2013.01); *G09B 17/003* (2013.01)

(58) Field of Classification Search
CPC .............................. G09B 17/003; G09B 19/06
USPC .......................................................... 434/157
See application file for complete search history.

(56) References Cited

U.S. PATENT DOCUMENTS

| | | | | |
|---|---|---|---|---|
| 5,812,863 | A | 9/1998 | Ishikawa | |
| 5,820,386 | A * | 10/1998 | Sheppard, II .......... | G09B 5/065 434/169 |
| 8,250,071 | B1 | 8/2012 | Killalea et al. | |
| 8,542,205 | B1 | 9/2013 | Keller | |
| 2003/0152894 | A1 | 8/2003 | Townshend | |
| 2003/0160830 | A1 | 8/2003 | DeGross | |
| 2004/0268253 | A1 | 12/2004 | DeMello et al. | |
| 2006/0069562 | A1 * | 3/2006 | Adams ..................... | G09B 5/00 704/251 |
| 2006/0173839 | A1 | 8/2006 | Knepper et al. | |
| 2007/0233461 | A1 | 10/2007 | Fasciani et al. | |
| 2007/0238076 | A1 | 10/2007 | Burstein et al. | |
| 2009/0306959 | A1 | 12/2009 | Rappoport et al. | |
| 2011/0087670 | A1 | 4/2011 | Jorstad et al. | |

(Continued)

OTHER PUBLICATIONS

PCT Search Report and Written Opinion dated Jul. 28, 2015 for PCT Application No. PCT/US15/27609, 9 Pages.

(Continued)

*Primary Examiner* — Robert P Bullington
(74) *Attorney, Agent, or Firm* — Lee & Hayes, P.C.

(57) ABSTRACT

Techniques are provided for selectively and dynamically determining one or more words of an electronic book to present with comprehension guides. For instance, an electronic device rendering an electronic book may determine whether to display some, all, or no words of the book with comprehension guides for words within the electronic book based on word difficulty, contextual importance or aspects of the user. Techniques are also provided for determining the content of comprehension guides to be presented with the words.

21 Claims, 13 Drawing Sheets

(56) References Cited

U.S. PATENT DOCUMENTS

| | | | |
|---|---|---|---|
| 2011/0276876 A1 | 11/2011 | Kwan et al. | |
| 2012/0109977 A1 | 5/2012 | Balinsky et al. | |
| 2012/0239379 A1* | 9/2012 | Gershnik | G06F 17/20 704/8 |
| 2013/0323693 A1 | 12/2013 | Gandhe et al. | |
| 2015/0310002 A1 | 10/2015 | Yu et al. | |

OTHER PUBLICATIONS

Office action for U.S. Appl. No. 14/262,690, dated Mar. 9, 2016, Yu et al., "Selective Display of Comprehension Guides", 11 pages.
Canadian Office Action dated Aug. 4, 2017 for Canadian patent application No. 2945632, a counterpart foreign application of U.S. Pat. No. 9,524,298, 3 pages.
Extended European Search Report dated Nov. 2, 2017 for European Patent Application No. 15783422.7, 9 pages.

* cited by examiner

ELECTRONIC BOOK 902

904 — There remained for consideration (*consideración*) merely the question of powders (*pólvora*). The public awaited with interest its final decision. The size of the projectile (*proyectil*), the length of the cannon being settled, what would be the quantity of powder (*pólvora*) necessary to produce impulsion (*impulsión*)?

—906

—908

It is generally asserted that gunpowder (*pólvora*) was invented in the fourteenth century by the monk Schwartz, who paid for his grand discovery with his life. It is, however, pretty well proved that this story ought to be ranked among the legends of the middle 910 — ages. Gunpowder was not invented by any one; it was the lineal
912 — successor of the Greek fire (*arma incendiaria*), which, like itself, was composed of sulfur (*azufre*) and saltpeter (*salitre*). Few persons are acquainted with the mechanical power (*potencia mecánica*) of gunpowder. Now this is precisely what is necessary to be understood in order to comprehend the importance of the question submitted to the committee (*comité*).

A litre of gunpowder weighs about two pounds; during combustion (*combustión*) it produces 400 litres of gas. This gas, on

— 900

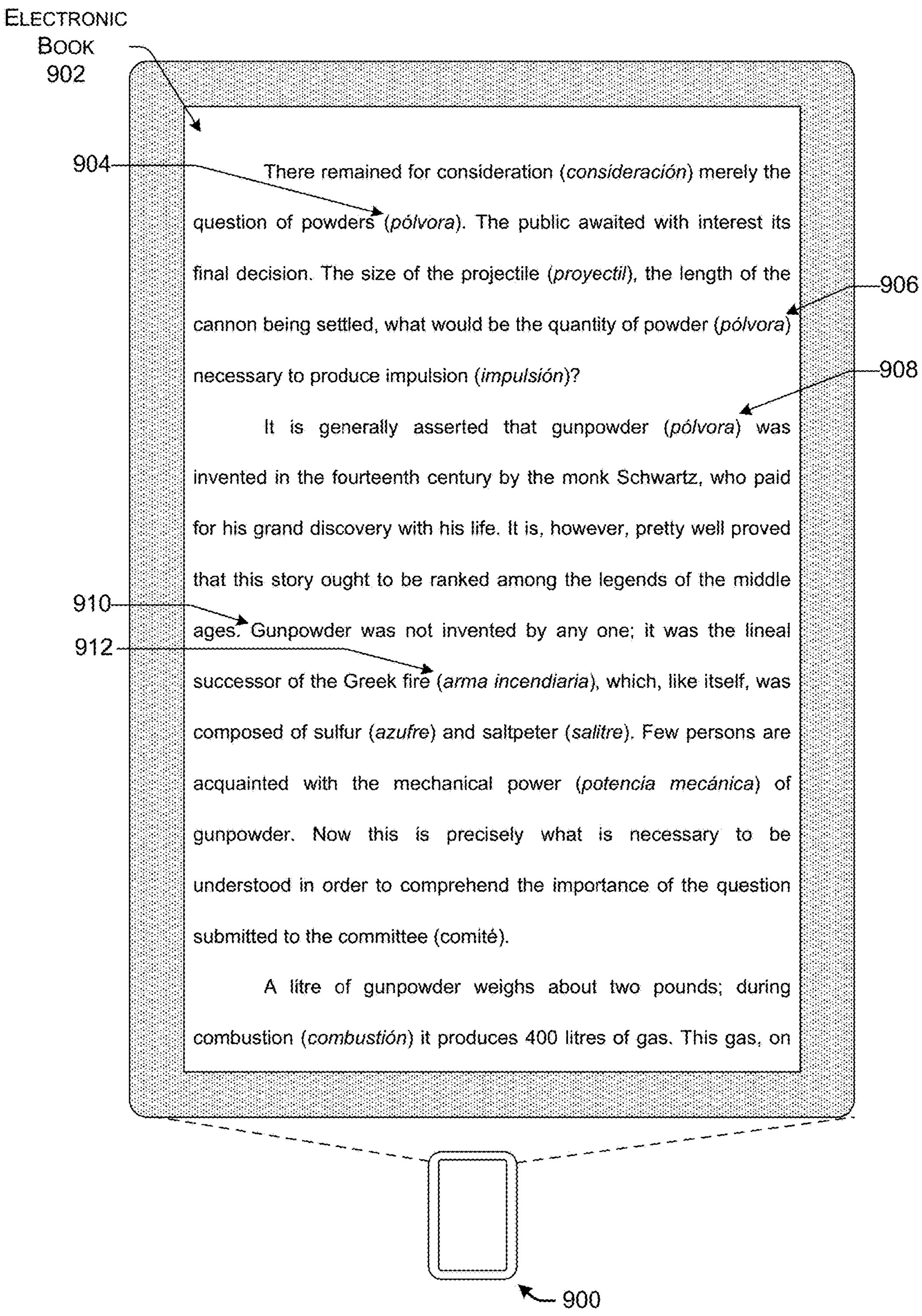

FIG. 9

ELECTRONIC BOOK 1102

1104

*to determine*
There remained for consideration merely the question of
*solid fuel*
powders. The public awaited with interest its final decision. The size
*bullet*
of the projectile, the length of the cannon being settled, what would
*solid fuel*                               *push*
be the qu

SELECTIVE DISPLAY OF COMPREHENSION GUIDES

BACKGROUND

When learning or otherwise reading a second (i.e. non-native) language, a reader may have difficulty reading materials above the reader's reading level. Further, the reader may also have difficulty in selecting reading materials that are of the correct reading level for the reader. In other cases, the reader may need to read materials above the reader's reading level, for example, materials related to the reader's job. Of course, issues of this type are not limited to second languages and may also occur where a reader reads first language materials above the reader's reading level or first language materials related to unfamiliar subjects, such as an unfamiliar technology area. Typically, when reading such materials, the reader may resort to a translation dictionary, a thesaurus, a technical manual, or other reference materials to read otherwise opaque portions of text.

While the use of reference materials helps readers read otherwise opaque portions of text, the use of reference materials presents several problems. For example, the reference materials may not be readily available. Even when the reference materials are available, the reference materials may also be above the reader's reading level. Moreover, repeatedly turning to the reference materials may be time-consuming and frustrating for the reader. Worse, the distraction caused by such interruptions may prevent the reader from comprehending the primary reading material or otherwise impede the reader's comprehension.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates a logic diagram of a module that may determine, for example, difficulty values of words, contextual importance of the words, rankings based on reader information and so on.

FIGS. 9-11 illustrate various examples of electronic books with comprehension guides displayed on an electronic device. In particular, each of FIGS. 9-11 illustrates an example format for presentation of the guides including several example guides.

FIG. 12 illustrates a study guide generated from the difficult words of an electronic book and FIG. 13 illustrates an implementation that utilizes the techniques disclosed herein to generate flash cards for the electronic book.

DETAILED DESCRIPTION

Figure 1:
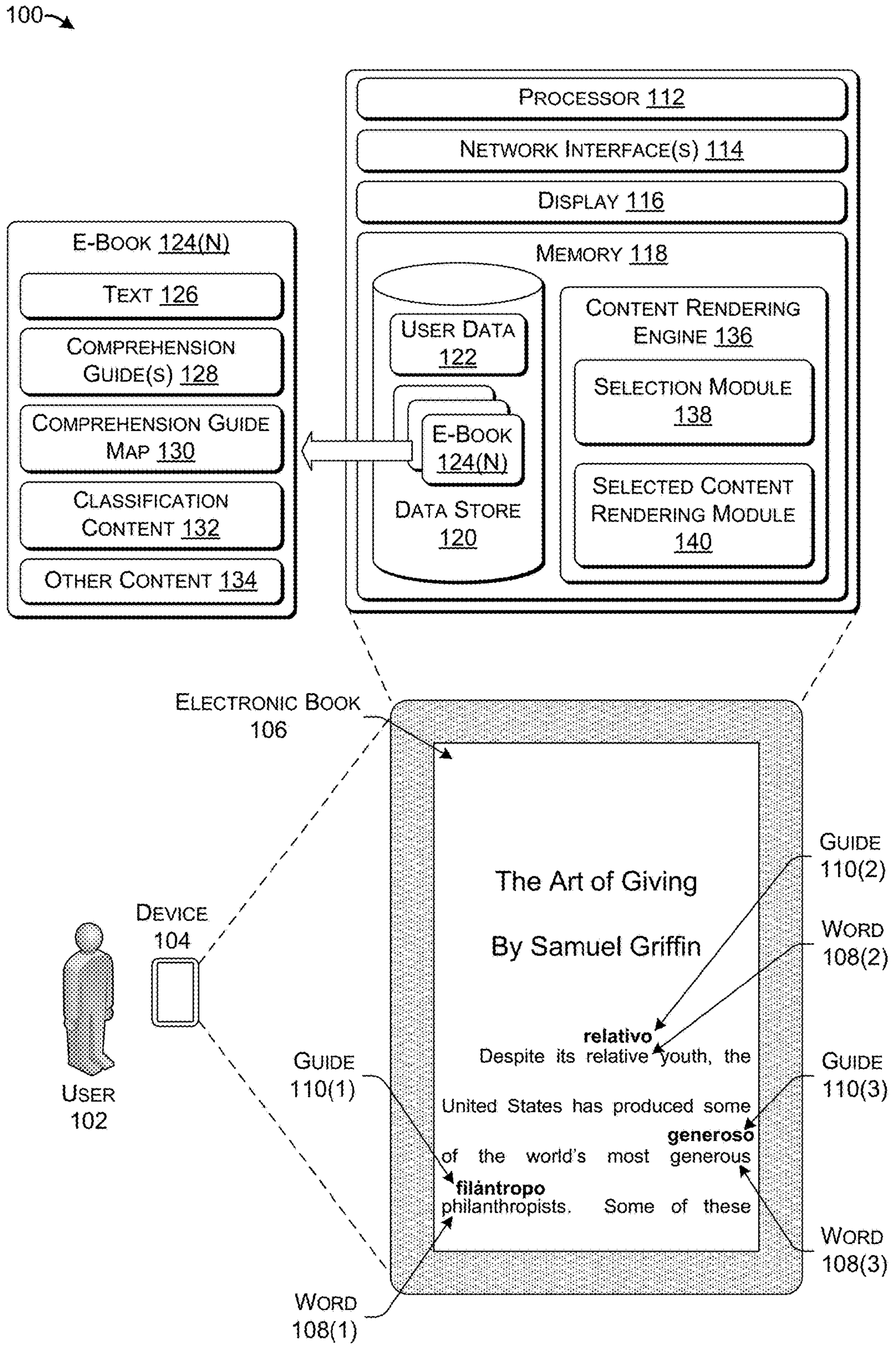
FIG. 1 illustrates an example electronic device that may selectively render comprehension guides based on word difficulty, contextual importance and/or aspects of a reader utilizing the device.

This disclosure describes, in part, techniques for selectively and dynamically determining an amount of comprehension guides to present with an electronic book or other electronic reading material (hereinafter electronic book). Further, this disclosure describes techniques for selectively and dynamically determining which words or other constituent parts of the electronic book to present with corresponding comprehension guides.

In some implementations, the determinations may be based at least in part on an evaluation or ranking of the words or other constituent parts of the electronic book, both in general and in the context of the electronic book. For instance, the words of the book may be assigned a general or default ranking that is adjusted to the context of the electronic book (e.g., genre of the book, subject area of the book and the word's importance within the context of the book) being prepared with comprehension guides. In some implementations, the rankings or evaluations of the corresponding words may, at least in part, reflect the difficulty of the corresponding words or the likelihood of the reader being familiar with or otherwise knowing and comprehending the word. Further, in some implementations, different rankings or evaluations may be determined for different meanings of corresponding words. For example, a more archaic or seldom used meaning of a word may have a higher ranking or evaluation than a common meaning or use of the same word.

In some implementations, the determinations may also or alternatively be based at least in part on an attribute or aspect of a reader (sometimes called a "user" herein) reading the electronic book. For instance, an electronic device rendering an electronic book may determine whether to display some, all, or no comprehension guides for words within the electronic book based on a reading level of the reader, an age of the reader, a first language of the reader, a geographic area or region associated with the reader or any other aspect that indicates the reader's proficiency in the language of the electronic book.

This disclosure also describes, in part, techniques for selectively and dynamically determining the content of comprehension guides to be presented for corresponding words of an electronic book. For example, in many languages, such as English, some words may have multiple, almost contradictory, meanings or uses as well as may synonyms. In some implementations, the meaning of the word as used is ascertained and a lower difficulty same language equivalent or translation of the word is determined.

The techniques are described below with reference to the following devices and processes. However, it is to be appreciated that a number of other devices may also employ these techniques. Furthermore, as used herein, the terms "book," "electronic book" or "eBook" may include any type of content which can be stored and distributed in digital form. By way of illustration, and without limitation, electronic books can include all forms of textual information such as books, magazines, newspapers, newsletters, periodicals, journals, reference materials, telephone books, textbooks, anthologies, proceedings of meetings, forms, directories, maps, manuals, guides, references, photographs, articles, reports, documents, etc., and all forms of audio and audiovisual works such as music, multimedia presentations, audio books, movies, images, and the like. Further, as used herein, the terms "book," "electronic book" or "eBook" are not limited to the entirety of any item and may be a page, a chapter, a section, a set of pages and so on within a textual electronic content item. Similarly, the term "electronic book," when used in the context of non-textual items, is not limited to the entirely or any particular portion of any item.

As used herein, comprehension guide includes any type of element, such as glosses, used to aid in comprehension of words or phrases of the text. For example, comprehension guides may include translations of words or phrases of the text. Additionally or alternatively, a comprehension guide may convey information in the same language as the content's text. For example, comprehension guides can present synonyms and/or definitions of the corresponding words and/or phrases of the text. In some implementations, comprehension guides may include multimedia items such as images, videos, sounds or the like.

As used herein, the term "word" refers to a portion of the electronic book for which a comprehension guide is or is to be mapped and therefore corresponds. As such, the term "word" is also contemplated as encompassing one or more words, "partial words," "N-grams," "idioms," "phrases" and so on. For example, in at least some contexts, the idiom "you are pulling my leg" means the other person is kidding, fooling, or tricking the speaker. This is not a meaning that is directly related to the terms "you," "are," "pulling," "my" and "leg." As will be discussed in more detail below, in some implementations, such "n-grams," "idioms," "phrases" and so on are recognized and treated as a singular unit and mapped to a singular corresponding comprehension guide that may comprise one or more words, "partial words," "N-grams," "idioms," "phrases" and so on. As such, the term "word," as used herein, includes such portions of the electronic book and is not limited to one word. Further, for clarity, the word "term" may be used herein to indicate a subset or portion of a "word" or a definition of a word. In a more particular example, the complex word "Greek fire" is made up of two terms, Greek and fire. Further, a simple definition of the complex word "Greek fire" may be "incendiary weapon" which includes the terms, incendiary and weapon. Of course, the particular examples give above are focused on the English language and other languages may differ.

FIG. 1 illustrates a user 102 utilizing an electronic device 104 to read an electronic book 106. As illustrated, the electronic book 106 in this example is written in English. In addition, a portion of the English words 108 of the electronic book are associated with guides 110(1), 110(2) and 110(3) that appear above to the corresponding words 108(1), 108(2) and 108(3). While these guides 110 appear above the corresponding words 108, the guides 110 may reside in any inter-linear position. In some implementations, the guides may appear inline adjacent to (e.g., to the left or right of) the corresponding local word 108 (e.g. in a parenthetical) or in another location.

FIG. 1 further illustrates, in greater detail, an example of the electronic device 104 that may selectively render comprehension guides that correspond to one or more words of the electronic book. Such selective rendering may be based on, among other things, a ranking or evaluation of, for example, a measure of the difficulty of the words of the book, in general and/or in one or more contexts. Moreover the selective rendering may be based on one or more aspects of the user 102 utilizing the device 104, such as a reading level of the user 102, an age of the user 102, settings input by the user 102, a first language of the user 102, feedback from the user 102, preferences of the user 102 or the like. Such information may further include information regarding similar users to user 102. While FIG. 1 illustrates the electronic device 104 as an electronic book reader, the device 104 may comprise any sort of device, such as a mobile phone, a multifunctional device, a desktop computer, a laptop computer, a game console, a personal media player, or the like. As illustrated, the device 104 includes one or more processors 112, one or more network interfaces 114, one or more displays 116, and memory 118. The device 104 may also include various additional components, such as one or more input devices that allow the user 102 to operate the device 104, an operating system, system busses, and the like.

The network interface 114 allows the electronic device 104 to communicate with content providers and other entities over networks, such as local-area networks (LANs), wide-area networks (WANs), the Internet, wireless networks, wireless wide-area networks (WWANs), cable television networks, telephone networks, cellular communications networks, combinations of the foregoing, and/or the like. The display 116, meanwhile, may comprise any sort of display for visually rendering electronic books, such as a liquid crystal display (LCD), a light-emitting diode (LED) display, an electronic paper display, or the like. The display 116 may further comprise an input device such as a touchscreen.

The memory 118 (and other memories described herein) stores a number of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

As illustrated, the memory 118 stores or otherwise has access to a datastore 120 that stores user data 122 and one or more electronic books 124(1), . . . , 124(N). The datastore 120 may store the electronic books 124(1)-(N) persistently or temporarily, as in the case where a content provider streams delivery of an electronic book being rendered the device 104. In either instance, FIG. 1 illustrates that the example electronic book 124(N) may include text 126, one or more comprehension guides 128, a comprehension guides map 130, classification content 132, and other content 134 of the book (e.g., images, videos, etc.). In some implementations, the electronic book 124(N) may be a stored copy of, or otherwise correspond to, the electronic book 106.

The text 126 may comprise any combination of phonographic characters (e.g., English words, etc.), logographic characters (e.g., Kanji characters, etc.) and/or any other type of character that form the words of the electronic book. Furthermore, some or all of the words 108 formed of these characters may correspond to respective comprehension guides 128. In some implementations, the comprehension guides 128 may comprise characters and/or any other item (s) and may be chosen to help a reader better understand the meaning of a corresponding word 108 of the text 126. In some instances, the comprehension guides 128 may comprise content that is configured to be output visually on a display, while in other instances the comprehension guides 128 may comprise content that is configured to be output audibly on one or more speakers of the device 104. For example, in some implementations, the comprehension guides 128 may include audio comprehension guides 128 that are recorded or synthesized spoken versions of one or more corresponding words 108 of the text or of a translation or synonym of the corresponding words 108 of the text. As mentioned above, textual comprehension guides may or may not be presented above the word 108 on the display.

The comprehension guide map 130 may map the comprehension guides 128 to the corresponding words or portions of the text 126. For instance, the comprehension guide map 130 may link a particular comprehension guide 128 to a particular word of the text 126 to which it corresponds (e.g., guide 110(1) may be mapped to word 108(1), guide 110(2) may be mapped to word 108(2) and guide 110(3) may be mapped to word 108(3)).

In some instances, the comprehension guides 128 and comprehension guide map 130 may accompany the text 126 of the eBook 124(N). For instance, when a publisher makes the eBook 124(N) available for acquisition, the publisher may include the comprehension guides 128 and the comprehension guide map 130 indicating suitable comprehension guides 128 and the mapping of the comprehension guides 128 to the text. In other instances, the device 104 or another entity (e.g., an entity that offers the eBook 124(N) for acquisition) may create the comprehension guides 128 and the comprehension guide map 130 or obtain the comprehension guide map 218 from a third-party source. For instance, a reference source may maintain comprehension guides which the third-party source has determined to be suitable comprehension guides for one or more words including words appearing in the eBook 124(N). The device 104 or the other entity may then identify the words within the text 126, obtain the corresponding comprehension guides, store the obtained comprehension guides as comprehension guides 128 and then map the comprehension guides 128 to the words of the text 126 in the comprehension guide map 130. In still other instances, the device 104 or another entity (e.g., the entity that offers the eBook 212(N) for acquisition) may actually create the comprehension guides for the different words within the text 214, store these comprehension guides as the comprehension guides 128 and then map the comprehension guides 128 to the words of the text 126 in the comprehension guide map 130. More details of such an implementation are discussed with regard to FIG. 3.

In addition, the comprehension guide map 130 may maintain a count of a number of instances of different words within the electronic book 124(N). For instance, the comprehension guide map 130 may store an indication of number of a times that each of multiple different words appear in the electronic book. This count of the number of instances particular words appear in the electronic book 124(N) may further account for different uses of the words (e.g., keep different counts and mappings for different meanings or senses of the various words). This information may then be used to view a distribution of words according to the word's frequency of use within the book 124(N). This distribution, in turn, may be used as a study guide of sorts. That is, the comprehension guide map 130 may make available a list of the most frequently used words within the electronic book 124(N) such that the user 102 may focus the user's learning on these prevalent words. Further, the words selected in the study guide may be filtered to remove words that, although frequently used within the electronic book 124(N), are one or more of: below the user's reading level; previously indicated by the user 102 as not to be given in a comprehension guide (e.g., the user 102 knows the word); have a low rankings or evaluations of the words or based on some other filter.

Finally, the classification content 132 may store, for example, indications of word difficultly, importance and/or any other indicator(s) of or factor(s) for determining the priority of the words of the text 126 for presentation with a comprehension guide. In other words, the classification content 132 may be utilized to determine whether or not to select a given word to be presented with a comprehension guide. For instance, the classification content 132 may identify, for one or more words in the electronic book, a difficulty level of the words specified in terms of frequency of use, reading level, age, or the like.

In one particular example, the classification content 132 may specify a reading level (e.g., first-grade reading level, second-grade reading level, etc.) of each word. In other implementations, the classification content may indicate a relative frequency of appearance of the words in one or more bodies of writings in the language of the words as a proxy for the difficulty of the word or the likelihood that the reader will know or otherwise be familiar with the meaning of the word. By classifying the words in this manner, the device 104 is able to determine when to present corresponding comprehension guides, as described in further detail below.

In some instances, the classification content 132 accompanies the text 126 of the eBook 124(N). For instance, when a publisher makes the eBook 124(N) available for acquisition, the publisher may include the classification content 132. For example, the publisher may include classification content 132 that includes measures of the difficulty level of the different words within the text, the relative importance of the different words within the text in the context of the book and/or other information. In other instances, the device 104 or another entity (e.g., an entity that offers the eBook 124(N) for acquisition) may obtain the classification content 132 from a third-party source. For instance, a reference source may maintain, for example, difficulty levels of respective words, and the device 104 or the other entity may identify the words within the text 126 and identify, from the reference source, the corresponding difficulty level of the words. The device 104 may then store the difficulty levels as the classification content 132. In still other instances, the device 104 or another entity (e.g., the entity that offers the eBook 124(N) for acquisition) may actually calculate, for example, the relative importance of the different words within the context of the text 126 and the eBook 124(N) and store the calculated importance as the classification content 132. More details of such an implementation are discussed with regard to FIG. 3. These are merely examples and are not limiting. These and/or different entities could determine these and/or different types of classification content in addition to the specific examples given above.

The memory 118 also stores or has access to a content rendering engine 136, which in turns stores or has access to a selection module 138 and a selected content rendering module 140. The selection module 138, meanwhile, functions to determine the particulars with which to render an electronic book, based at least in part on the user's guide profile, other information in the user data 122 and the classification content 132 (e.g., which words should be presented with comprehension guides 128). The selected content rendering module 140 functions to render the electronic books 124(1)-(N) on the display 116 of the device 104 and/or on other output components of the device 104 (e.g., speakers, etc.) such that the text 126 is presented with the comprehension guides 128 selected by the selection module 138.

For instance, when the user 102 requests to render the electronic book 124(N) on the display 116, the selection module 138 may determine a reading level at which to render the electronic book 124(N) based on the user's guide profile. For instance, a low reading level may be indicative of a lower difficulty threshold for selection of words for comprehension guides and a high reading level may be indicative of a higher difficulty threshold for selection of words for comprehension guides. In some instances, the selection module 138 may make this determination with reference to an attribute or aspect of the user 102 or users similar to user 102. Some examples information that may be included in the user's guide profile include a reading level of the user 102, a grade level of the user 102, an age of the user 102, a primary language of the user 102, geographical information of the user 102, user feedback, user preferences, or the like. The user 102 may specify this guide profile when requesting to render the electronic book 124(N) or prior to requesting to render the electronic book, or the module 138 may determine this information in any other way (e.g., by querying the user regarding their understanding of certain words within the book or another book).

In still another example, the module 138 may determine the particulars for rendering the electronic book 124(N) at least partly with reference to the user's guide profile to determine the user's primary language and to compare the primary language to a language of the electronic book 124(N). For instance, if the electronic book 124(N) is written in English and the user 102 specifies Japanese as the user's primary language, then the module 138 may set the reading level relatively low such that more comprehension guides are presented than would otherwise be the case for two more closely related languages, such as French and Spanish.

The selection module 138 may make a selection of words to be presented with guides based on any number of other factors. For example, a close proximity of two words that have a relatively high priority for presentation with comprehension guides may be taken into account such that a particular occurrence of a word of the high priority words is given a reduced priority to avoid an excessive density of comprehension guides in a given location. Similarly, a higher priority may be assigned to another occurrence of the word that is present in proximity to the de-prioritized occurrence the word (e.g., on a previous or next page). The presence of the other occurrence of the word in proximity to the de-prioritized occurrence may also be a factor in choosing the word whose occurrence is to be de-prioritized. For example, where two words occur in close proximity of each other which both have a high priority for presentation with a guide, if another occurrence of one of the two words was present, for example, on the previous page; the occurrence of the word currently under consideration may be given a lower priority for presentation with a comprehension guide.

In some implementations, the comprehension guides 128 included in the eBooks 124 may include more than one possible comprehension guide 128 for one or more of the words of the text 126. In such implementations, the proximity and space concerns mentioned above may be taken into account when determining which of the possible comprehension guides should be mapped to a particular occurrence of the word. For example, rather than not providing a comprehension guide for one of two high priority words in close proximity, the selection module 138 may operate to choose comprehension guides of relatively short length and present the short comprehension guide for each word.

Similar operations may be performed in a case in which the user modifies the displayed format of the text 126 (e.g., font, font size, line spacing, etc.) in such a manner that two or more previously non-conflicting comprehension guides to overlap or become too close together. The selection module 128 may operate to determine if other comprehension guides 128 that would not conflict are available to replace the now-conflicting comprehension guides 128. If so, the conflicting comprehension guides may be replaced. Otherwise, the selection module 128 may operate as discussed above to provide a comprehension guide for one of the two words, but not both.

Based on the guide profile of the user 102, the determined reading level, the classification content 132 and other information, the selection module 138 may determine a subset of words of the book 124(N) to render with corresponding comprehension guides and a subset of words of the book 124(N) to render without corresponding comprehension guides.

For instance, if the user 102 provides an indication in the user's guide profile that the user 102 is able to read at a ninth-grade reading level, then the selection module 138 may compare this reading level to the classification content 132 of the words of the text 126 of the electronic book 124(N). In this example, the module 138 may render comprehension guides for some or all of the words of the text 126 that are above a ninth-grade reading level, while refraining from rendering comprehension guides for some or all words of the text 126 that are at or below the ninth-grade reading level.

Furthermore, the selection module 138 may create additional subsets in some implementations. For instance, the selection module 138 may refrain from displaying comprehension guides for any instances of words that are classified as being below the user's reading level by a relatively large amount. For example, the module 138 may determine that a particular word is associated with a second-grade reading level—well below the user's ninth-grade abilities—and may therefore refrain from displaying comprehension guides for any instances of this word within the electronic book 124 (N).

Additionally, the selection module 138 may identify words that are nearer or at the user's reading level. For instance, the module 138 may determine that a particular word is associated with an eighth- or ninth-grade reading level. As such, the module 138 may cause display of a comprehension guide for the first "N" instances of the word within the electronic book 124(N), where N is any number greater than zero. As such, the techniques still aid the user 102 in an appropriate manner while assuming that the user 102 will eventually learn the words that is at or near the user's reading level.

Furthermore, the module 138 may also identify words having classified reading levels that are a threshold amount above the user's reading level. For instance, the module 138 may identify a word that is classified as being at an eleventh-grade reading level. In response, the module 138 may place this word into a subset of words for which the module 138 will render the corresponding comprehension guide for "M" instances of the word, where M is any number greater than N. Because this word is above but still near the user's reading level, the module 138 may display the comprehension guide for a certain amount of time while refraining from displaying the comprehension guide later in the book 124(N), thus encouraging the user to increase her reading level.

In yet another example, the selection module 138 may identify words that are well above the user's reading level. For instance, the selection module 138 may identify a word that is associated with a twelfth-grade reading level. For this and other similarly-situated words, the selection module 138 may cause display of the corresponding comprehension guide for all occurrences of the corresponding word.

While a few example subsets have been discussed, it is to be appreciated that the selection module 138 may create or define more or fewer subsets of words in other implementations. Regardless of the number of subsets of words, the content rendering engine 136 may render the electronic book 124(N) in accordance with the subsets selected by the selection module 138. For instance, the selected content rendering module 140 may display the electronic book 124(N) on the display, with at least one of the words having corresponding comprehension guides for each instance of the word, at least one of the words having guides for some but not all instances of the word, and at least one of the words not including the guides at all.

While FIG. 1 illustrates one example device, it is to be appreciated that multiple other devices and architectures may implement the described techniques. For instance, the components illustrated as being located on or accessible to the device 104 may be located in any other location, such as on one or more of servers that are accessible to the device over a network, spread out amongst servers, located on other electronic devices, and/or the like. A more detailed example of such an implementation is discussed with regard to FIG. 3.

Figure 2:
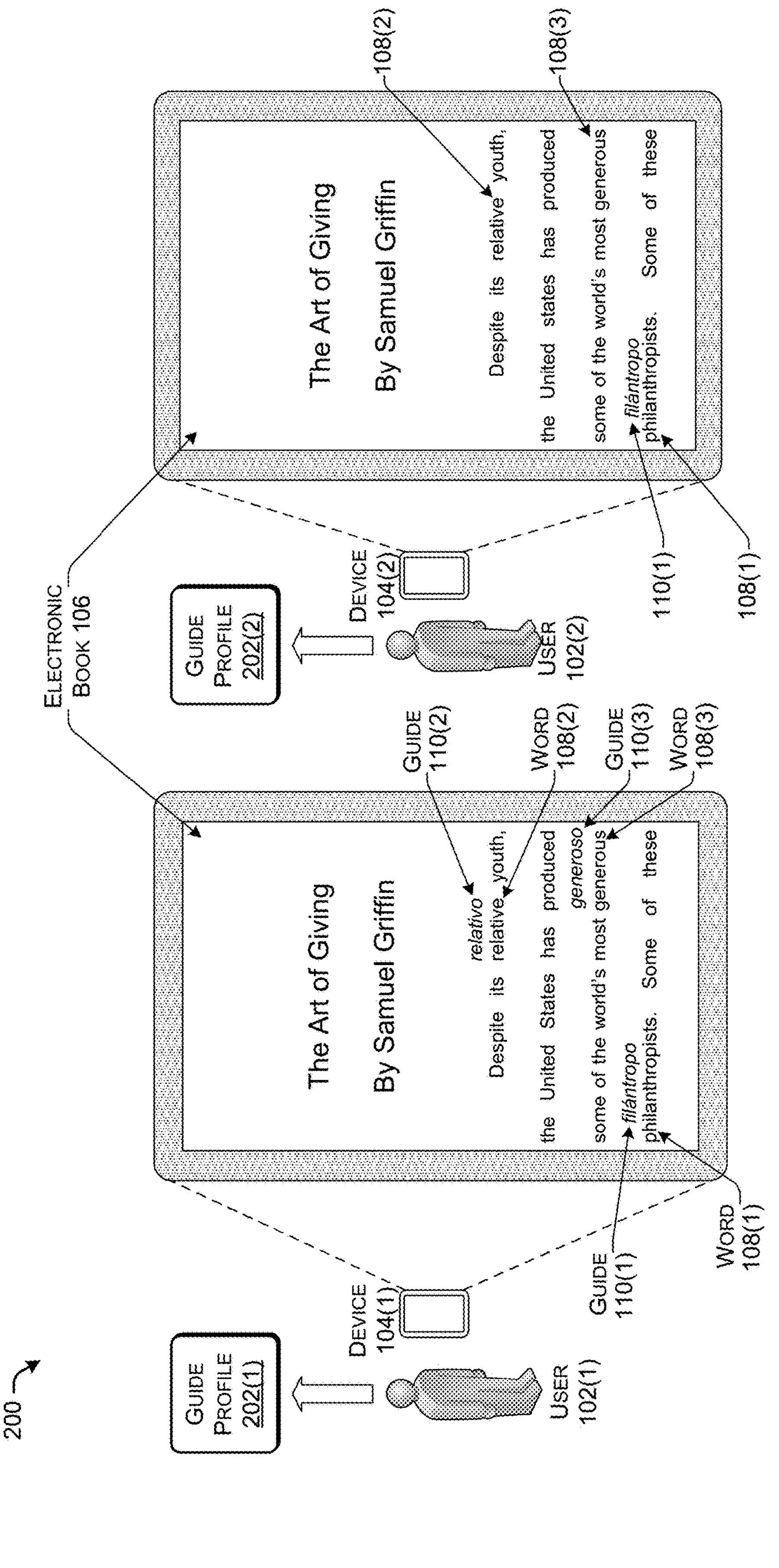
FIG. 2 illustrates an example of two electronic devices that may render different amounts of comprehension guides based at least on aspects of the reader.

FIG. 2 illustrates a user 102(1) utilizing an electronic device 104(1) to read an electronic book 106, while a user 102(2) utilizes an electronic device 104(2) to read the same electronic book 106. As illustrated, the electronic book in this example is written in English with Spanish comprehension guides 110 that appear adjacent to (i.e., above) respective words 108 of the electronic book 106. While these comprehension guides appear above the corresponding words, the comprehension guides may reside in another location in other implementations.

As illustrated, the user 102(1) is associated with a guide profile 202(1), while the user 102(2) is associated with a different guide profile 202(2). In this example, a reading level associated with guide profile 202(1) is lower than a reading level associated with guide profile 202(2). Based on these different reading levels, the device 104(1) renders more comprehension guides within the electronic book 106 than does the device 104(2). By rendering more comprehension guides, the device 104(1) allows the user 102(1) to rely more on the user's 102(1) first language to comprehend the corresponding words when compared to the user 102(2). Of course, while FIG. 2 illustrates displaying relatively few comprehension guides for a relatively higher reading level, in some instances the techniques may display more and/or different comprehension guides for a relatively higher difficulty level.

To illustrate, the device 104(1) renders a portion of the electronic book 106 that includes, in part, words 108(1), 108(2), and 108(3), as well as corresponding comprehension guides 110(1), 110(2), and 110(3). In this example, the device 104(1) renders each comprehension guide 110(1)-(3) above the corresponding word 108(1)-(3). With use of the comprehension guides 110(1)-(3), the user 102(1) is able to comprehend the eBook 106, and hence learn the corresponding English words 108(1)-(3). While FIG. 2 illustrates a comprehension guide corresponding to a single term, in other instances, respective sets of one or more comprehension guides may correspond to two or more terms (i.e., compound words, phrases, idioms, n-grams, etc.).

The device 104(2), meanwhile, renders fewer comprehension guides within the electronic book 106 than does the device 104(1), given that the user 102(2) is associated with a higher reading level. In this example, the device renders the comprehension guide 110(1) associated with the word 108(1), while refraining from rendering the comprehension guides 110(2) and 110(3) associated with the words 108(2) and 108(3), respectively. Therefore, the user 102(2) is able to comprehend the word 108(1) by referring to the comprehension guide 110(1), while the user 102(2) presumably already knows the words 108(2) and 108(3).

As illustrated, the devices 104(1) and 104(2) selectively display comprehension guides (here in the form of Spanish words) based on the corresponding guide profiles 202(1) and 202(2) of the users 102(1) and 102(2). These users 102(1) and 102(1) may have explicitly selected the information included in the guide profiles, the devices may have determined the guide profiles (e.g., with reference to an aspect of the user), or the guide profiles may have been determined in any other manner.

For example, the users 102(1) and 102(2) may have provided an input into the respective devices 104(1) and 104(2), which the devices may have used to determine the respective guide profiles 202(1) and 202(2). For instance, the users 102 may have indicated their respective reading levels in Spanish, their respective ages, their respective grade levels, their respective primary languages (e.g., Spanish, English, etc.), or may have provided any other input that the devices may utilize for determining the appropriate guide profiles 202 for rendering the electronic book.

In another example, the devices may include physical or virtual controls (e.g., icons) that allow the users to increase and decrease the amount of comprehension guides rendered within the electronic book 106. For instance, the devices may include a physical or virtual dial that allows the user to increase or decrease the amount of the comprehension guides as the user desires. The controls that allow the user to increase and decrease the amount of comprehension guides rendered within the electronic book 106 may also be dynamic and/or customized for the user. For example, a virtual dial may allow the user to set a reading level, a difficulty level, a number of guides to be displayed, etc. In some implementations, the electronic device 104 may customize the range of the dial or control or may set a default value for the dial or control based on the information about the user and/or similar users. In some implementations, the devices may query the user on the meaning of a series of words to determine their reading levels and, hence, the guide profiles 202 to use when rendering the electronic book.

Furthermore, as the proficiency of the users 102(1) and 102(2) in the English language progresses, the devices may dynamically modify the corresponding guide profiles 202(1) and 202(2). In one example, after the users have learned the meaning of a particular word, the users may select the word and request that the device refrain from displaying comprehension guides for subsequent instances of the particular word in the electronic book 106 or in general. The users may make this selection via any sort of input component of the devices 104(1) and 104(2), such as via a touchscreen, via audible commands, or in any other manner.

In another example, the devices 104(1) and 104(2) may determine how the users' proficiencies progress (or regress) and may alter the guide profiles 202(1) and 202(2) accordingly. For instance, the devices may periodically or randomly query the users' understanding of particular words and, as the users' understanding and memorization of these words progress (or regress), may increase or decrease the reading level of the guide profiles 202(1) and 202(2) for the purpose of showing more or fewer comprehension guides. For instance, if the user 102(1) indicates that she has now memorized a particular word, the device 104(1) may refrain from showing comprehension guides for future instances of the particular word.

In still another example, the devices 104(1) and 104(2) may determine the appropriate guide profiles for the users, or may determine the users' progress, with reference to the users' consumption of the electronic book on the devices 104(1) and 104(2). For instance, these devices may include cameras and corresponding technology for identifying the users' gaze on the device displays. If one of these cameras detects that the user's gaze remains on a particular word on the display for a long period of time, then the device may deduce that the user does not understand the particular word at which the user is looking. Conversely, if the user's gaze moves across a page of content relatively quickly, then the device may deduce that the user understands the words on that page quite well. The device may then calculate the appropriate guide profile for the user with reference to this information.

Figure 3:
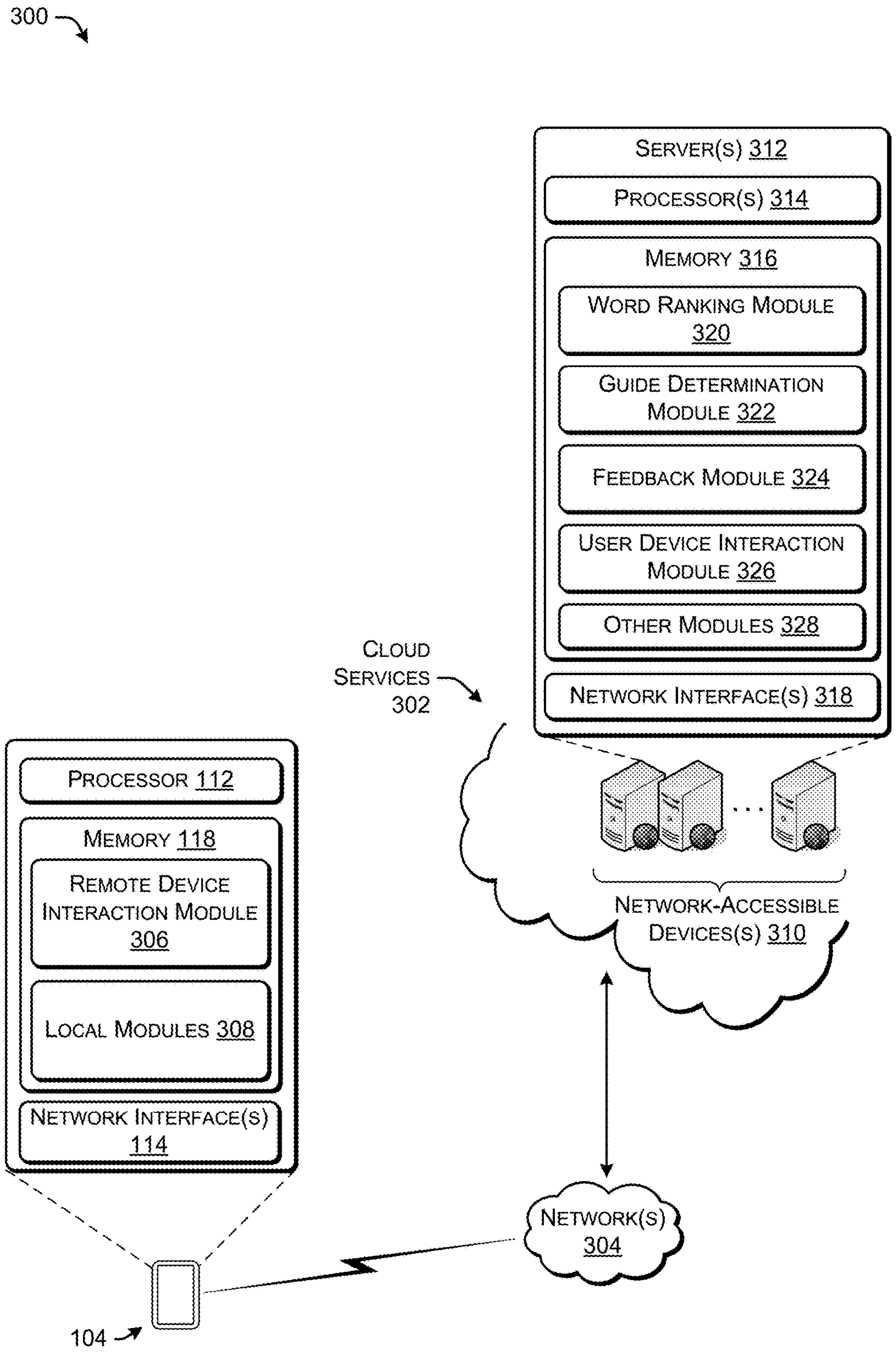
FIG. 3 illustrates an architecture that may provide for determining at difficulty values of words, contextual importance of the words, and so on, and then using the determined information to selectively present comprehension guides to readers of electronic books.

FIG. 3 illustrates an example architecture 300 showing an implementation of the device 104 that interacts with cloud services 302 to obtain e-books, such as those described above. The cloud services 302 generally refer to a network accessible platform implemented as a computing infrastructure of processors, storage, software, data access, and so forth that is maintained and accessible via a network 304 such as the Internet. Cloud services 302 may not require end-user knowledge of the physical location and configuration of the system that delivers the services. Common expressions associated with cloud services include "on-demand computing", "software as a service (SaaS)", "platform computing", "network accessible platform", and so forth.

In this implementation, the device 104 may be configured with one or more remote device interaction module(s) 306 and one or more local modules 308 available in the memory 118 that provide instructions to the processor(s) 112. The one or more local remote device interaction module (s) 306 may make requests for eBooks from the cloud services as well as perform functions on behalf of or in response to instructions from the remote cloud services 302 relating to one or more of obtaining, for example, user data for the preparation of eBooks in some implementations. The local modules 308 may provide the functionality of the device 104 discussed above with respect to FIG. 1.

The cloud services 302 include one or more network-accessible devices 310, such as servers 312. The servers 312 may include one or more processors 314, memory 316 and network interface(s) 318. The processor(s) 314 and the memory 316 of the servers 312 are physically separate from the processor(s) 112 and memory 118 of the device 104, but may function jointly as part of a system that provides processing and memory in part on the device 104 and in part on the cloud services 302. These servers 312 may be arranged in any number of ways, such as server farms, stacks, and the like that are commonly used in data centers.

In general, the operations of the word ranking module 320, guide determination module 322, feedback module 324, the user device interaction module 326 and/or other modules 328 of the servers 312 operate to create or otherwise prepare e-books in a format similar that illustrated in FIG. 1.

More particularly, the word ranking module 320 may generate or assign ranking indicia to words such as the previously described classification content 138. More detail regarding an example implementation of the word ranking module 320 is provided below with regard to FIG. 4.

The guide determination module 322 may operate to determine proper comprehension guides for the words of an eBook. As previously discussed, for many languages, such a determination may include determining which of several valid meanings of a particular word is embodied in each occurrence of the word in the eBook. The guides may also be required to meet size and reading level requirements to be accepted as appropriate guides for the corresponding words. More details regarding the operation of the guide determination module 322 is provided with regard to FIG. 5.

The feedback module 324 may operate to collect feedback from the user devices, such as through the user device interaction module 326. Using the feedback, the operations of the server(s) 312 may be adapted to provide improved results. For example, the word ranking module 320 and guide determination module 322 may include functionality to adapt their operation based on feedback from users and/or other sources. More details regarding the operation of the guide determination module 322 is provided with regard to FIGS. 4-5 and 10.

The user device interaction module 326 operates to interact with the user devices, such as through the network interface(s) 318. For example, the user device interaction module 326 may receive a request from the device 104 for an electronic book that includes comprehension guides in a format similar to electronic books 124(N) shown in FIG. 1. Upon receiving the request from the device 104, the user device interaction module 326 may initialize the word ranking module 320, the guide determination module 322 and so on to generate an electronic book with comprehension guides based on the request (e.g., languages, type of guidance, user data, etc.). Once the electronic book has been prepared with comprehension guides, the user device interaction module 326 may operate to deliver the prepared electronic book to the device 104 (e.g. via the network interface(s) 318 and network 304). As previously mentioned, the user device interaction module 326 may also operate to receive feedback from the device 104 which may be used to adapt the operation of the servers 312 (e.g., the operations of modules 320, 322, etc.). The user device interaction module 326 may provide the feedback to the feedback module 324 for such a purpose.

As shown in FIG. 3, the servers 312 may include other modules 328. Depending on the implementation, the other modules may perform a number of operations such as those previously described with regard to the device 104 of FIG. 1 (e.g., in an implementation in which the previously described operations of the selection module 138 are carried out by the servers 312 rather than the device 104).

While FIG. 3 illustrates one example system for implementing the disclosed techniques, it is to be appreciated that multiple other devices and architectures may implement the described techniques. Moreover, the operations described above for the system shown in FIG. 3 are not limiting and many variations and/or additional functions of the described system are contemplated within the scope of this disclosure.

Figure 4:
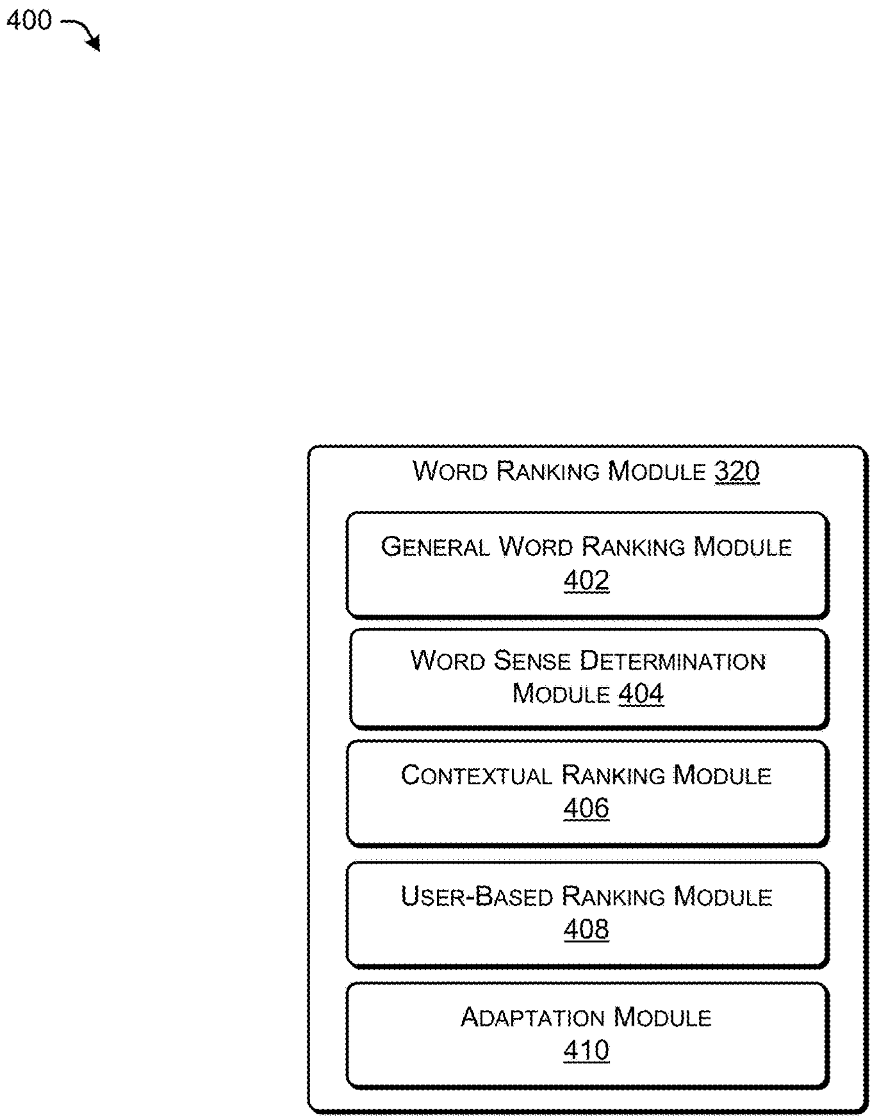

FIG. 4 illustrates an example logic diagram 400 of an example word ranking module 320 that provides for the ranking or prioritization of words for comprehension guides according to some implementations. In some implementations, the word ranking module 320 may the embodied as computer executable instructions stored in a memory. The operations of the word ranking module 320 may be performed by a distributed computing system or by a non-distributed computing system. As illustrated in FIG. 4, the word ranking module includes a general word ranking module 402, a word sense determination module 404, a contextual ranking module 406, a user-based ranking module 408 and an adaptation module 410. The function of each of these modules is described below in turn.

The general word ranking module 402 may operate to provide a general or non-contextual ranking or score for each of a plurality of words. In some implementations, the ranking or score of a word provided by the general word ranking module 402 may be indicative of a relative difficulty and/or importance of the word among the plurality of words. For example, in some implementations, the general word ranking module 402 may assign such a ranking or score to the each word of a language.

In some implementations, the ranking or score may be calculated based on, for example, the frequency with which the word appears within a corpus of writings (e.g., a large collection of writings of a language). When determining the words most likely to be unfamiliar to a second language reader, a correlation occurs between the frequency with which a word appears in the writings of the language and the likelihood that the second language reader will not know the word. Specifically, in general, the less frequent the word appears in literature or writings, the higher the likelihood the second language reader will not know the meaning of the word. The general word ranking module 402 may reflect this correlation by assigning a higher ranking or score to words that appear with less frequency. In some implementations, the frequency with which words appear may be determined using a large corpus. The use of a large corpus may provide more reliable rankings or scores.

In general, the operations of the general word ranking module 402 are performed without reference to a particular context, user, situation, etc. As such, in some implementations, for a given language, the general word ranking module 402 may generate a "universal" or otherwise reusable ranking or score for the words or phrases of the language that may be used with regard to a plurality of eBooks.

The functions of the contextual ranking module 406 and the user-based ranking module 408 may, in some implementations, be based upon or performed in view of particular use or sense of the word being ranked or evaluated in the electronic book. For example, some implementations may assign different rankings or evaluations or otherwise give different treatment to different uses or meanings of the same word. As mentioned above, in some example implementations, an archaic or seldom used meaning of a word may have a higher ranking or evaluation than a common meaning or use of the same word. Of course, the different treatment of different meanings of the same word is not limited to contextual ranking or user based ranking and may also be present in the determination of general or non-contextual rankings or evaluations.

The word sense determination module 404 operates to determine the use or sense of the words of the text. For instance, the contextual ranking or score of the phrase, "pulling my leg" depends on the use or sense of the phrase. For example, if the phrase is used in its literal sense, the physical act of pulling my leg, a contextual ranking or score intended to reflect comprehension difficulty may assign a low ranking or score to the words of the phrase. On the hand, if the phrase is used in the sense of the idiom for a trick or joke, the contextual ranking or score may reflect a higher comprehension difficulty because non-native English speakers are less likely to be familiar with this use of the phrase. There are a number of techniques that may be employed to determine or disambiguate the use of words in the text.

In one approach, the module 404 may parse the text to determine the use of the words in the text. The parsing function may recognize phrases or idioms based on their structure and from definitions thereof. Many idioms follow a pattern of one or more fixed words or root forms of words that may be separated by one or more variables words. The fixed words typically have a set order of appearance in the idiom. For example, the idiom, "pull my leg," has many other variations such as "pulling your leg," "pull his leg," and so on. To recognize the idiom, the parsing function made be provided a pattern which forms of the idiom follow and detect this pattern in the text. In this case, the pattern of the idiom, "pull my leg" might be expressed as ("pull", X words or less, "leg") where X is a value set for the particular idiom. By parsing the text to locate the patterns, the parsing function may operate to make preliminary identifications of idioms. In some implementations, the word sense determination module 404 may further include functionality to analyze words surrounding a preliminarily identified idiom for indications that the words are being used to form an instance of the idiom.

Similarly, compound words or other N-grams may be identified by the parser functionality. Some examples of compound words are United States, high school, peanut butter and real estate. In some implementations, compound words are treated as one concept such that a single comprehension guide maps to each instance of the compound word. This is because at least some compound words have different meanings when their constituent terms are used separately.

Moreover, the word sense determination module 404 may use functionality that analyzes surrounding words to determine the use or sense of words. For example, the word "fire" has multiple meanings that may be ascertained from surrounding words. For example, the word sense determination module 404 may determine whether the word "fire" is used in the sense of a fire that burns or the sense of a firing of a gun. To do so, the word sense determination module 404 may analyze surrounding text to ascertain if words related to guns, fighting or the like appear, or if words related to burning appear such as ash, blacken, heat or the like. In some implementations, the word sense determination module 404 may determine the part of speech (e.g., noun, verb, adjective, etc.) within which the instance of the word falls. For at least some words, the determination of the part of speech may be sufficient to identify the sense of the word in the context it is used.

The contextual ranking module 406 may operate in a similar manner to the general word ranking module 402. However, in some implementations, the contextual ranking module 406 provides a rank or score for words within one or more context(s). Some example contexts are: a context of a particular book; a context of a genre or subject area; a context related to a relation of two languages (e.g., English and Spanish, English and Japanese, Chinese and Japanese, etc.) such as whether the languages share a common root language or whether the word in a first language is similar to its translation in a second language in question; a time period of the subject matter of the book; a date of publication of the book; and so on.

For example, the contextual ranking or score for a word in the context of the particular book may be determined based on the relation or importance of the word to the subject of the book. In one particular example, the relative ranking or importance of the word "photosynthesis" in the context of a book about the production of energy in plants may be higher than the ranking or importance of the word "photosynthesis" in the context of a book about chemical reactions in which photosynthesis is mentioned to involve a chemical reaction described in the book. For example, the importance of the word "photosynthesis" may be higher in the context of the book about the production of energy in plants because of a higher number of occurrences in such a book.

On the other hand, a difficulty ranking based on frequency of the term within the book about the production of energy in plants may determine that, in the context of the book, the word "photosynthesis" is more likely to be known or not as difficult as the word might be evaluated to be in another context. In other words, a second language reader of a biology book is more likely to know the second language word for the biology word, "photosynthesis," even though "photosynthesis" may be above the reader's general reading level. The balancing of the importance and difficulty factors may vary from implementation to implementation. For example, important words in the context of the book which appear frequently in the book but which have a lower relative difficulty ranking in general may be displayed with comprehension guides a limited number of times. This may ensure the reader is given the meaning of an important word while reducing unnecessary repetition as well as potentially avoiding the inclusion of guides for words that may be familiar to a reader that frequently reads books in the subject area.

A ranking or score for the context of a genre or subject area may be determined in several ways. In some implementations, the subject matter contextual ranking or score may be determined based on, for example, the relative frequency the word appears within a corpus of written materials related to the subject area. As mentioned above, a reader reading a second language biology eBooks is more likely to know the second language word for "photosynthesis" than a reader of a mystery novel that includes the word "photosynthesis" in a technobabble explanation. As such, the word "photosynthesis" should have a lower difficulty based contextual rank or score for eBooks related to biology due to its higher frequency of occurrence in a corpus of biology eBooks relative to a corpus of eBooks from all subject areas. The importance that a reader understand the word "photosynthesis" when reading eBooks from the subject matter area of plant biology coupled with the relative frequency of occurrence of the word in the subject matter area may be balanced by showing a guide for the word "photosynthesis" a limited number of times rather than for each occurrence of the word throughout the eBook.

In operation, the user-based ranking module 408 may, at the server 312, make determinations regarding the ranking of the words of the text of eBooks that are similar determinations to those discussed above regarding the selection module 138. In addition, the user-based ranking module 408 may operate to collect information about the reader, such as a native language, known second languages, reading levels in those languages, reading history, educational background, fields of interest, work industry, preferences, vital information and so on. The user-based ranking module 408 may use the collected information to classify the reader among similar readers. For example, the module 408 may classify readers into clusters of readers. Based on the clustering of the readers, the user-based ranking module 408 may determine the user-based ranking or score for words of the text based at least in part on information from other users of the cluster.

The above described example ranking and scoring determinations are merely examples and the implementations of the techniques disclosed herein are not so limited. As would be understood by one of ordinary skill in the art in view of this disclosure, any number of variations or alternative determination may be used without departing from the scope of this disclosure.

The adaptation module 410 may operate to adapt the weighting of various factors and/or the determination logic employed by the modules 402-408 based on any of a number of sources of feedback. For example, the device 104 may provide a functionality for the reader to select a comprehension guide 110 and indicate if the guide was unwanted, incorrect, helpful, correct, used terms within the guide that were still above the reader's reading level, was too long, that the density of guides on the page or in the eBook is too sparse, too dense, etc.

In addition to inputs related specifically to comprehension guides, other interactions of the reader with the device 104 and/or electronic book 106 may be taken as feedback for adjusting the operation of the modules 402-408. For example, if the device 104 includes a look-up functionality in addition to the comprehension guides 110, the adaptation module 410 may adapt the ranking of the looked-up words based on the assumption that the looked-up words should have been chosen to have comprehension guides. For example, the adaptation module 410 may adapt the logic of the user-based ranking module 408 to give higher priority to the looked-up word or the adaptation module 410 may add the looked-up word to a list designating words to be presented with comprehension guides for the user or similar users.

The adaptation module 410 is not limited to these example adaptation operations. For example, in some implementations according to the disclosed techniques, the adaptation module 410 may employ a machine learning algorithm to trains the logic of the modules 402-408. Non-limiting examples of machine learning algorithms include artificial neural networks, support vector machines, Bayesian networks, and so on. In other implementations, the adaptation module 410 may operate to implement adaptations determined by human evaluators reviewing feedback from user devices, such as device 104. For example, a human evaluator may receive feedback indicating that one or more similar readers reported a particular word selected for presentation with a guide was below their reading level and that the guide was unnecessary. Based on the feedback, the human evaluator may adjust the word selection properties of the particular word to reduce the ranking or score of the particular word for selection to be presented with a guide. This modification may be universal or limited in scope (e.g., only affecting readers similar to those reporting the issue).

Figure 5:
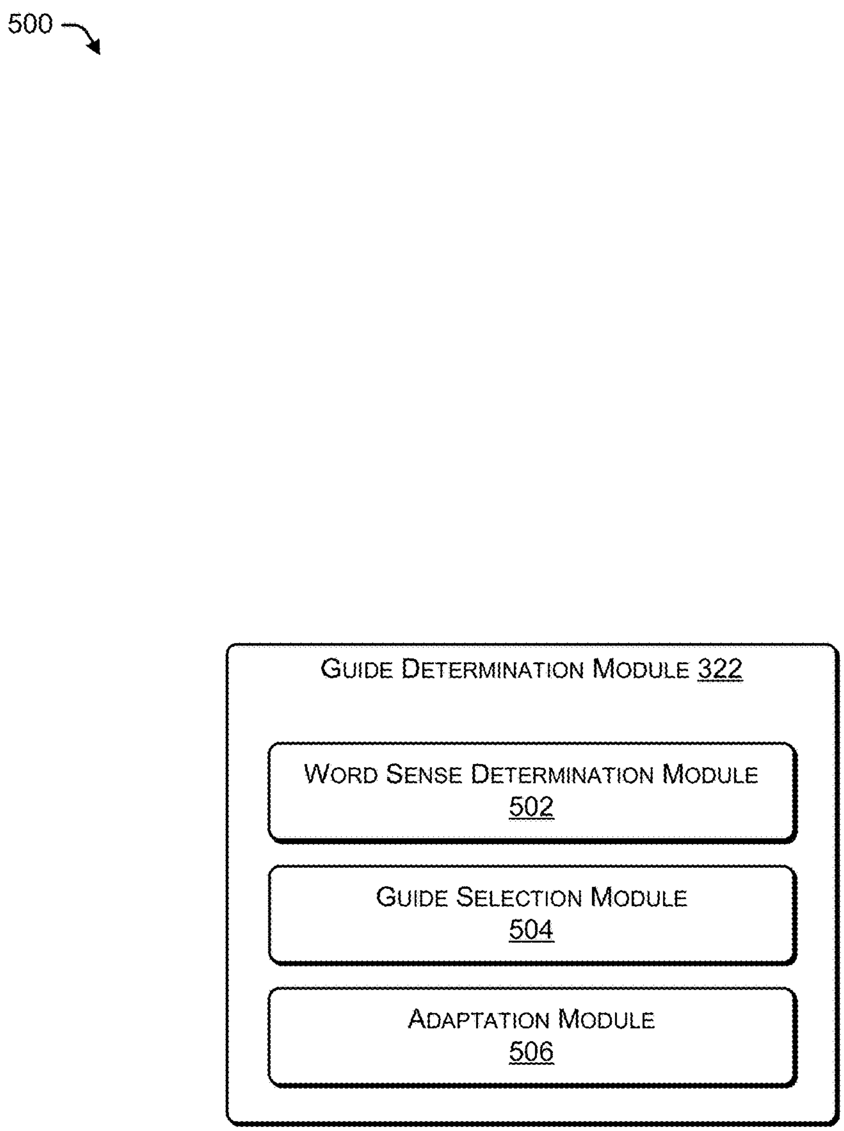
FIG. 5 illustrates a logic diagram of a module that may determine the content of comprehension guides for words or instances of words.

FIG. 5 illustrates an example logic diagram 500 of an example guide determination module 322 that generates or selects one or more comprehension guides for the words of the text of an electronic book 106 according to some implementations. In some implementations, the guide determination module 322 may be embodied as computer executable instructions stored in a memory. The operations of the guide determination module 322 may be performed by a distributed computing system or by a non-distributed computing system. As illustrated in FIG. 5, the guide determination module 322 includes a word sense determination module 502, a guide selection module 504 and an adaptation module 506. The function of each of these modules is described in turn below.

The word sense determination module 502 may operate a similar manner to that disclosed above for the word sense determination module 404. In some implementations, the word sense determination modules 404 and 502 may be combined within one of modules 320 or 322 or may be implemented as a separate module that interacts with the modules 320 and 322. This is merely an example and in other implementations, the word sense determination module 502 may operate differently from the word sense determination module 404. For example, some implementations of the word sense determination module 502 may include additional or fewer functions, operate according to a different principle, or the like.

For a given use or sense of a word in the text 126, the guide selection module 504 operates to generate or select one or more corresponding comprehension guides. As mentioned previously, the comprehension guides may be in the same language as the corresponding word, a different language from the corresponding word or a non-textual comprehension guides such as an image guide, an audio guide, or a video guide.

In some implementations in which the comprehension guide is in the same language as the corresponding word, the generation or selection of the comprehension guides may select one or more words that are a same language equivalent or same language definition of the correspond word. In some implementations, the guide selection module 504 selects a comprehension guide that include words or a definition that are of a lower ranking or score than the corresponding word (e.g., lower difficulty or reading level). This may be performed in several ways. First, for some languages like English, there may be known lists of the most commonly used or least difficult words of the language. One example of such a list is the general service list that includes many low difficultly words in the English language. When generating a comprehension guide, the guide selection module 504 may determine whether a comprehension guide may be formed of one or more words in the general service list. If words outside of the general service list are needed (e.g., the guide selection module 504 is unable to create a meaningful guide using the words of the general service list), the guide selection module 406 may look for other words which may have a lower difficulty level than the word being replaced. The difficulty level for the words may be determined in a manner similar to that discussed above for the general word ranking module 402, the contextual ranking module 406 and/or the user-based ranking module 408.

In some implementations, the guide selection module 504 may utilize dictionaries or other references to determine comprehension guides for particular words. For example, some learner's dictionaries include simplified definitions of words. In some implementations where definitions are utilized as the basis for comprehension guides, the guide selection module 504 may reduce the length of the definitions to ensure the comprehension guides fit in the space available for the guide. This may be done in a variety of ways. In some implementations, the guide selection module 504 may parse the definition to reduce the definition to its "core" parts. For example, a definition of "joyful" may be "characterized by or full of joy." The guide selection module 504 may parse the definition and eliminate conjunctions or alternatives in the definition. In some implementations, the guide selection module 504 may eliminate alternatives based on the difficulty of the words of the respective alternatives. For example, in the definition of "joyful" given above, the alternative phrase "characterized by" is more difficult than the alternative phrase "full of." Therefore, the guide selection module 504 may select the simpler alternative phrase and eliminate the more difficult alterative phase. As such, the guide selection module 504 may select the phrase, "full of joy" as the comprehension guide for "joyful."

In some implementations, the guide selection module 504 may also remove modifiers (e.g., adjectives or adverbs) from definitions. For example, when determining a synonym for the word "zucchini," a reference dictionary may have a definition of "green vegetable." The guide selection module 504 may simplify the definition by removing the adjective "green" to provide a guide of "vegetable." Should the word "vegetable" be above the reading level of the reader, the guide selection module 504 may determine and select a lower reading level synonym for "vegetable," such as "food."

In addition or as an alternative, the guide selection module 504 may utilize a lexical database to determine suitable comprehension guides. For example, an English lexical database may include nouns, verbs, adjectives and adverbs grouped into sets of cognitive synonyms. In some lexical databases, each set of cognitive synonyms express a distinct concept. One example of such a lexical database is WordNet®.

In addition to determining a comprehension guide for words of the text, the guide selection module 504 may also verify that the selected guide satisfies one or more constraints. For example, such constraints may include the length of the guide, a maximum number of words, a maximum reading level differential or any other limit that the user of the system wishes to have verified prior to final selection of the guide.

The above discussion of the guide selection module 504 is not intended to be limiting and many variation would be apparent in view of this disclosure. For example, as previously discussed with regard to FIG. 1, the guides are not limited to text and may include, for example, multimedia guides (e.g., images, sound files, etc.). In some implementations, the guide selection module 504 may determine whether to include a multimedia guide based on a number of factors. One type of factor relates to the age of the reader and/or whether the book is a children's or young reader's book. In particular, if the reader is of a young age and the book is a children's book, the guide selection module 504 may determine to include images as comprehension guides for difficult nouns in the book. For example, if the word "horse" were above the reader's reading level, the guide selection module 504 may include a comprehension guide that comprises a small image of a horse. In another example, if the word that is to be displayed with a guide is the word "cow," the guide selection module 504 may include a guide comprising a sound file of a cow "mooing."

Implementations utilizing multimedia comprehension guides are not limited to children's books. For example, another case in which multimedia comprehension guides may be utilized is with regard to chemical compound names. In particular, when a second language reader is reading a chemistry text, the compound names may be difficult to interpret. As such, the guide selection module 504 may operate to include a pictorial representation of the bonding of the chemical compound to aid in comprehension.

The adaptation module 506 may operate in the same manner as the adaptation module 410. For example, where a reader provides feedback indicating that a synonym type comprehension guide is of too high a reading level, incorrect, etc., the adaptation module 506 may operate to adapt the logic or weighting of various factors in the operation of the modules 502 and 504.

Figure 6:
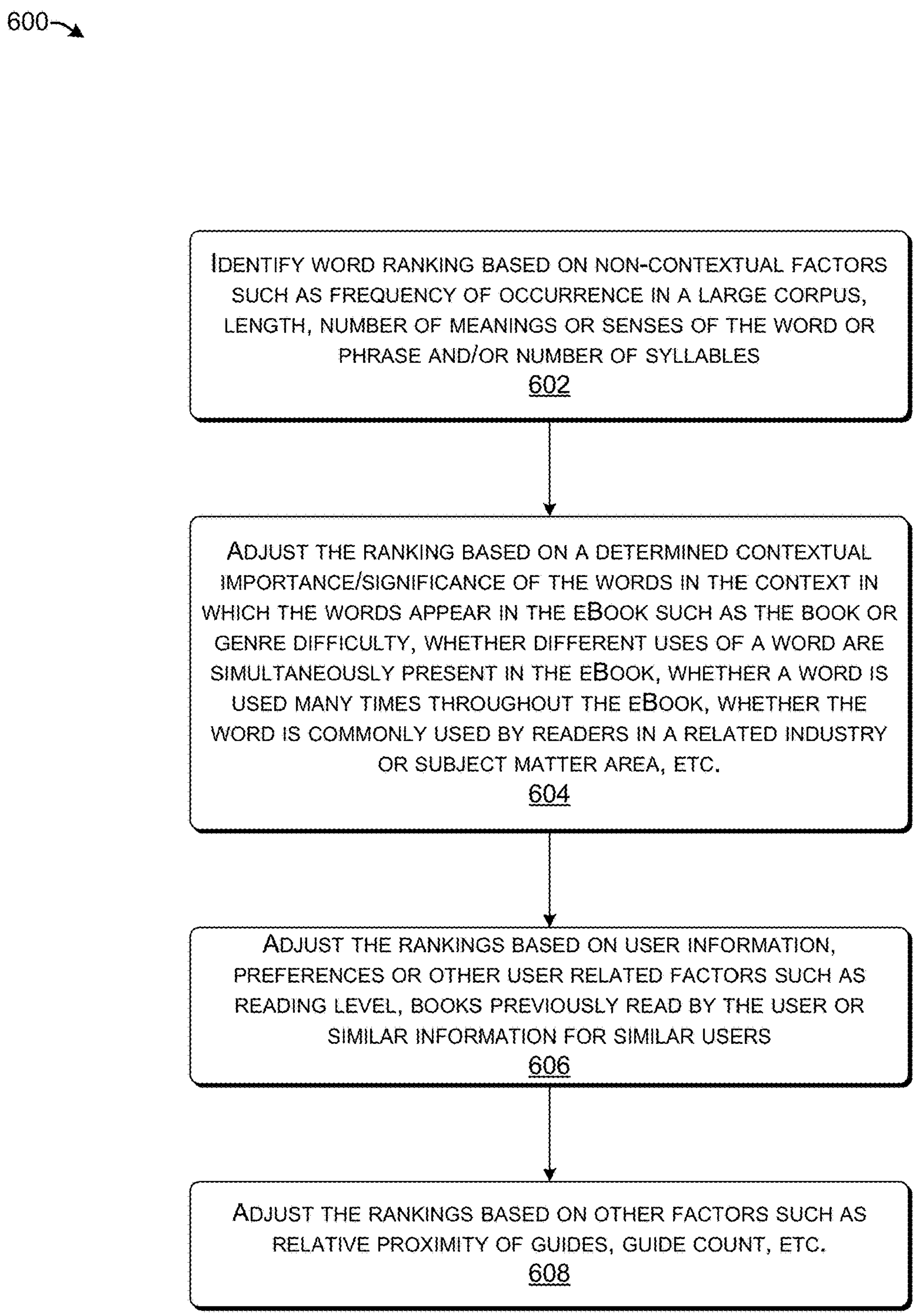
FIG. 6 illustrates an illustrative process for determining the relative priority or ranking of words based on difficulty or frequency of occurrence of the words, the contextual importance of the words, and aspects of users.

FIG. 6 illustrates an example flow diagram 600 for selectively ranking or prioritizing words of a text for presentation with corresponding comprehension guides using the techniques described herein. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

At 602, an electronic device, such as a server 312 or a device 104, identifies a ranking or score for words based on non-contextual factors such as frequency of occurrence of the word in a large corpus, word length, number of meanings or senses of the word or phrase and/or a number of syllables in the word. As discussed above, the operation 602 may be performed for the words of an eBook or may be performed for all words and common phrases (e.g., idioms and compound words) of the language and used for multiple eBooks.

At 604, the electronic device may adjust the rankings or score based on contextual factors. For example, the electronic device may determine the contextual importance/significance of the words in the context in which the words appear in the book based on factors such as the book or genre difficulty, whether different uses of a word are simultaneously present in the eBook, whether a word is used many times throughout the book, whether the word is commonly used by readers in a related industry or a subject matter area of the eBook, etc. Although discussed herein as being performed as an adjustment of the general word ranking or score for a particular book, for at least some of the factors, the contextual importance score of words may be determined and used for a plurality of eBooks. For example, contextual importance and ranking scores may be determined for a subject matter area and applied to eBooks that fall into the subject matter area. Further, in some implementations, the contextual importance or significance may be determined as a separate score or ranking for the eBook and combined with the general word ranking in a subsequent operation or used independent of the general word ranking.

At 606, the electronic device adjusts the rankings or scores of words of the text of the eBook based on user information, preferences or other user related factors. Several example user-based determinations were discussed above with respect to the user-based ranking module 408 of FIG. 4. As mentioned above, in some implementations, the user-based determinations may be based on user information of similar users. For example, similar users may be ascertained using a clustering algorithm.

At 608, the electronic device may adjust the rankings based on various other factors. For example, the electronic device may adjust the rankings based on the relative proximity of instances of words with high scores in the eBook. As discussed above, such factors as guide density, guide count, number of occurrences of each word throughout the eBook and the like may be used to adjust the ranking or scoring of the words and/or the particular instances of the words in the text.

Using the resulting rankings or scores, the electronic device may determine a subset of the words to display with corresponding comprehension guides and a subset of the words to display without corresponding comprehension guides. Furthermore and also as discussed above, the device may define further subsets, such as a subset of words for which to display corresponding comprehension guides for a particular number of instances of the words, and the like.

The blocks 602-608 are not intended to be limit implementations nor intended to imply that the operations described blocks are unitary and/or encapsulated within the steps or in a particular order. In other words, in various implementations the blocks 602-608 may be reordered, combined divided and so on. Moreover, as alluded to above, the details of the procedure for determining the rankings or scores may vary from implementation to implementation. For example, in some implementations, the determination may be a weighted summation wherein some of the above described factors are utilized to weight various other factors in a summation. In such an example implementation, a non-contextual score may be determined by ranking words in a language according to their frequency in a general corpus of writings. For example, the non-contextual score may be a numeric frequency ranking of the word among words of the language in the general corpus weighted by other factors. For example, a word's ranking may be multiplied by a factor determined by how many meanings the word has in the language and/or the number of syllables. For example, the non-contextual score may be determined as:

$$\text{Non-Cntxtl Score} = \text{Rank}*(1.0+(0.03*\text{Meanings})+(0.02*\text{Syllables}))$$

A book specific contextual ranking may similarly be determined from a ranking of frequency of occurrence in the book of the word area which is weighted by one or more other factors, such as the number of different meanings of the word present in the book. For example, the contextual score may be determined as:

$$\text{Cntxtl Score} = \text{BookRank}*(1.0+(0.09*\text{BookMeanings}))$$

A user score for the word may then be generated. For example, the user score may be determined based on as the user's reading level in the language, the reading level of the word and whether the user has looked up the word previously. In a particular implementation, the user score may be determined as:

$$Usr\ \text{Score} = \frac{UserReadingLevel}{WordReadingLevel} + LookedUp$$

where LookedUp is one (1) if the user has looked up the word and zero otherwise.

The non-contextual score, contextual score and user score may then be combined and, in some implementations, the result may the adjusted based on other factors. For example, the score may be adjusted based on whether the user has previously indicated that the user is familiar with the word (e.g. via a feedback mechanism). More particularly, in some implementations, the overall score may be determined as:

$$\text{Overall Score} = (\text{Non-}Cntxtl\ \text{Score} + Cntxtl\ \text{Score}) * \frac{1}{Usr\ \text{Score}} * \text{Familiarity}$$

where Familiarity is zero (0) if the user has indicated that the user is familiar with the word and one (1) otherwise.

In some implementations, various factors may change the effect of various other factors entirely (e.g., a factor may increase the ranking of a word for one value of a second factor but decrease the ranking of the word for a second value of the second factor). For example, a high subject matter area contextual score (e.g. a score that indicates the word is important or frequently occurs in the subject matter area) may have different impacts for different users. For a user who is familiar with the subject matter area of a book (e.g. a user who has a related degree), a high subject matter area contextual score of a word may lower the overall score because the user may be more likely to know the word. For another user who does not have such a familiarity or connection to the subject matter area, the high subject matter area contextual score may increase the overall score because the user may be less likely to know the word and is likely to need to know a word that is likely important to the subject matter area of the book.

Figure 7:
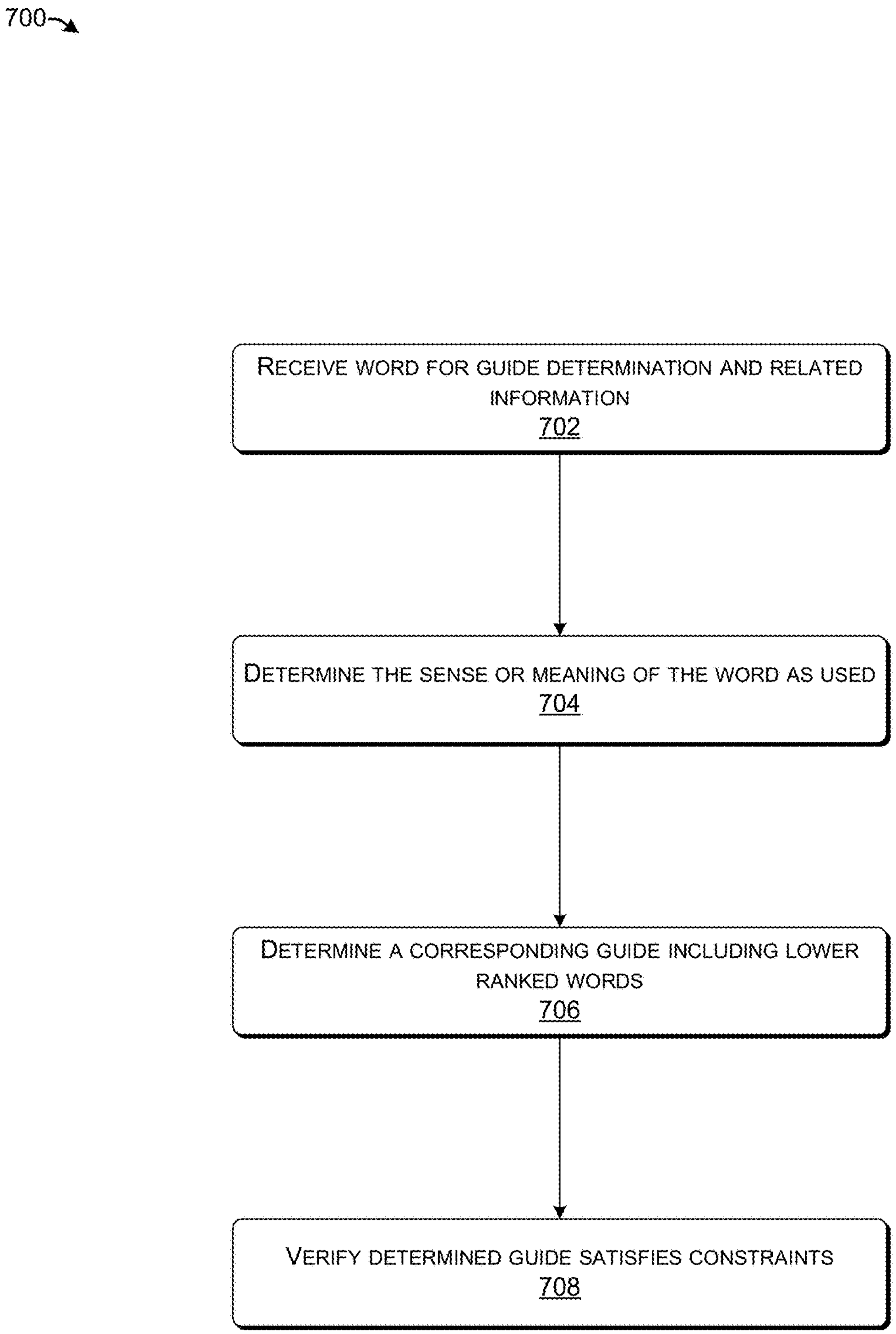
FIG. 7 illustrates an illustrative process for determining the content of comprehension guides.

FIG. 7 illustrates an example flow diagram 700 for determining the content of comprehension guides for words of a text using the techniques described herein.

At 702, an electronic device, such as a server 312 or the device 104, receives a word for guide determination along with related information. At 704, the electronic device determines the sense or meaning of the word as used in the eBook (unless this information is provided). For example, using surrounding words in the eBook as context, the electronic device may determine which the sense or meaning of the word is present in the eBook. Additional example techniques for performing such a determination were discussed above with respect to the word sense determination module 404.

At 706, the electronic device may determine a corresponding guide including a translation or one or more lower ranked words that are an equivalent of the word. Several example approaches to determining appropriate guides were discussed above with respect to the guide selection module 504. At 708, the electronic device may verify the determined guide satisfies one or more constraints. As discussed above, such constraints may relate to the length of the guide (e.g. size of the terms, images, etc. of the guide), a reading level differential, a number of syllables, etc.

Figure 8:
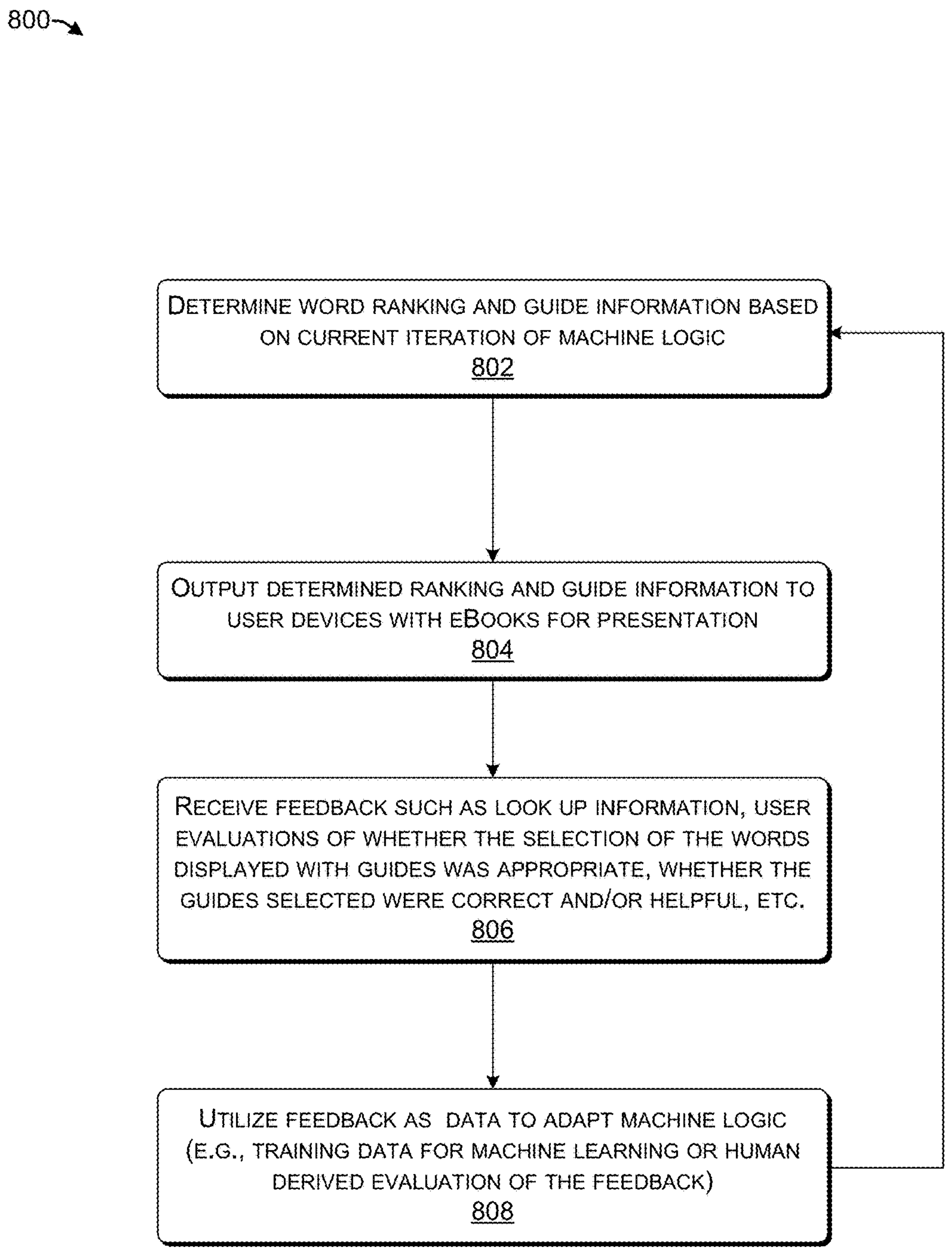
FIG. 8 illustrates an illustrative process for adapting the determination of which words to present with comprehension guides and the content of the comprehension guides based on user feedback or other training data.

FIG. 8 illustrates an example flow diagram 800 for adapting the function of the servers 312 using machine learning in accordance with the techniques described herein.

At 802, one or more of the servers 312 may operate to determine word rankings and guide information based on the current iteration of the machine logic. For example, the server 312 may operate the word ranking module 320 and guide determination module 322 to determine a priority or ranking of words of an eBook for presentation with guides and to select guides that should be mapped to the words of the eBook. At 804, the determined ranking and guide information may be output to user devices with eBooks for presentation. For example, the determined ranking and guide information may be packaged into the eBook in a format similar to that shown in FIG. 1.

At 806, the servers 312 may receive feedback such as word look-up information, user evaluations of whether the selection of the words displayed with guides was appropriate, whether the guides selected were correct and/or helpful, etc. At 808, the servers 312 may utilize the feedback as training data to adapt the machine logic of the modules 320 and 322 using machine learning. The process may then return to 802.

Though implementations described herein use machine learning algorithms, implementations of the techniques set forth herein are not so limited. Rather, some implementations may utilize human reviewers to adapt the operation of the modules 320 and 322 while others may include a combination of human input and machine learning.

Figure 10:
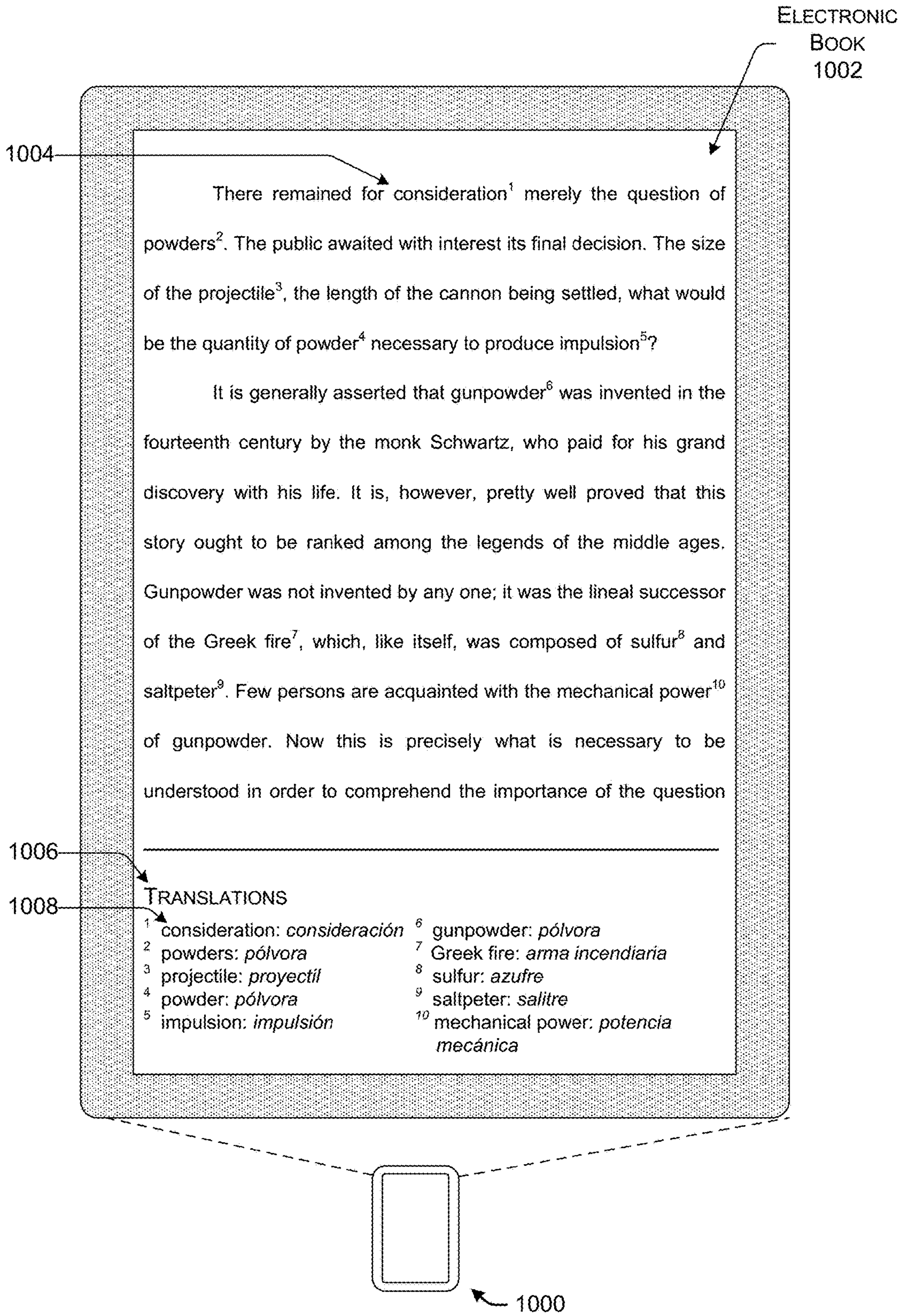
Figure 11:
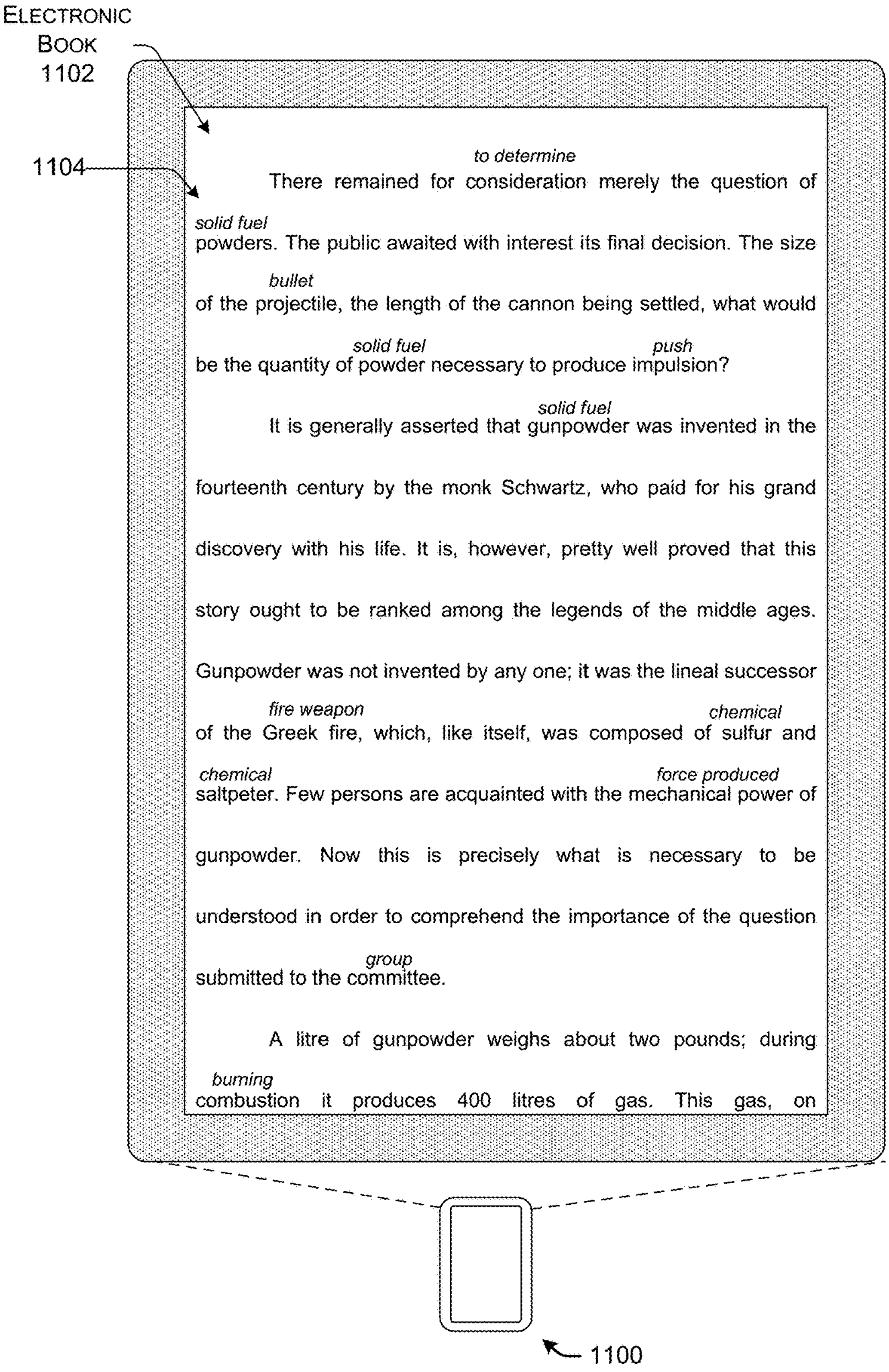

FIGS. 9-11 illustrate various examples of electronic books with comprehension guides displayed on an electronic device. In particular, each of FIGS. 9-11 illustrates an example format for presentation of the guides including several example guides.

FIG. 9 illustrates a device 900 displaying an electronic book 902 with comprehension guides displayed as in line parentheticals. The text of the book is in English. In some implementations generating the portion of the eBook 902 shown in FIG. 9, the reader may be a native Spanish speaker and the comprehension guides are Spanish equivalents of the words of the text to which the guides correspond.

FIG. 9 further illustrates several guides that are selected due to reasons other than general difficulty. For example, the word "powders" may not be determined in general to be a difficult word. However, when the meaning of the word as used at 904 is factored in, the difficulty rating of the word may be increased. Specifically, the word "powders" is used in the text of the eBook to refer to gunpowders and other solid fuels rather than powders in general. Non-native English readers are unlikely to be familiar with this usage of the word "powder." As such, the Spanish word for gunpowder, "pòlvora," is included as a comprehension guide. On the other hand, had the word "powders" been used in the more common sense to refer to powdered solids in general, the word may not have been selected for display with a comprehension guide.

The further occurrences of guides for "gunpowder" and its equivalents at 906 and 908 and the lack of a guide for "gunpowder" at 910 illustrate two more example functions previously discussed. First, the occurrences of "gunpowder" at 910 and after may be shown without a guide due to the total number of guides on the page being more than a threshold. Due to this and that forms of gunpowder occur on the page six times, the scores or rankings of instances of powder or gunpowder may be lowered after the third occurrence. Second, the occurrences of "gunpowder" at 910 and after may be shown without a guide due to the number of guides for forms of gunpowder being limited to three occurrences throughout the eBook.

Additionally, the words "Greek fire" are given a comprehension guide due to these words forming a compound word that does not have its literal meaning (i.e., a fire that is Greek). One definition of "Greek fire" is "an early incendiary weapon used by the ancient Greeks." As such, rather than include a literal translation of "Greek fire," the guide 912 is based on the definition of the compound word. However, the definition is lengthy. As such, the definition is reduced in length based on the techniques described above. In particular, the definition is a shortened to the subject noun of the definition (i.e., weapon) and one adjective (i.e., "incendiary"). This simplified definition is then translated to the Spanish phrase, "arma incendiaria."

FIG. 10 illustrates a device 1000 displaying an electronic book 1002 with comprehension guides displayed as footnotes. As with FIG. 9, the text of the book is in English and the guides are in Spanish. In particular, the words selected to be displayed with comprehension guides, such as the instance of "consideration" at 1004 are marked with footnotes that appear in the footer under the header "translations" 1006. In the particular example guides shown in FIG. 10, such as guide 1008, the guides comprise the marked word or phrase and the Spanish equivalent (e.g., "consideration" and "consideraciòn").

FIG. 11 illustrates a device 1100 displaying an electronic book 1102 with comprehension guides displayed above the corresponding word of the text. As with FIGS. 9 and 10, the text of the book is in English and the reader of the electronic book 1102 may be a native Spanish speaker. However, unlike FIGS. 9 and 10, the guides are in English. In particular, the guides of FIG. 11 are words or phrases that are lower reading level equivalents of the corresponding words of the text to which the guides correspond. For example, instead of including the Spanish word for "gunpowder" or the word "gunpowder" at 1104, the guide corresponding to "powders" at 1104 is the lower reading level phrase "solid fuel." There are two reasons for the selection of solid fuel rather than gunpowder. First, the frequency of occurrence of gunpowder in the corpus of English language writings is less than the frequency of occurrence of either of the words "solid" and "fuel." As mentioned previously, the frequency of occurrence of words is a strong indicator of the likely difficulty of comprehension of the word for readers. In this case, the words of the phrase "solid fuel" are separable because it is a noun modified by an adjective and not a true compound word. As such, the reading level of the phrase "solid fuel" may be determined as the reading level of the most difficult word of the phrase which will be a lower reading level than the word "gunpowder."

Figure 12:
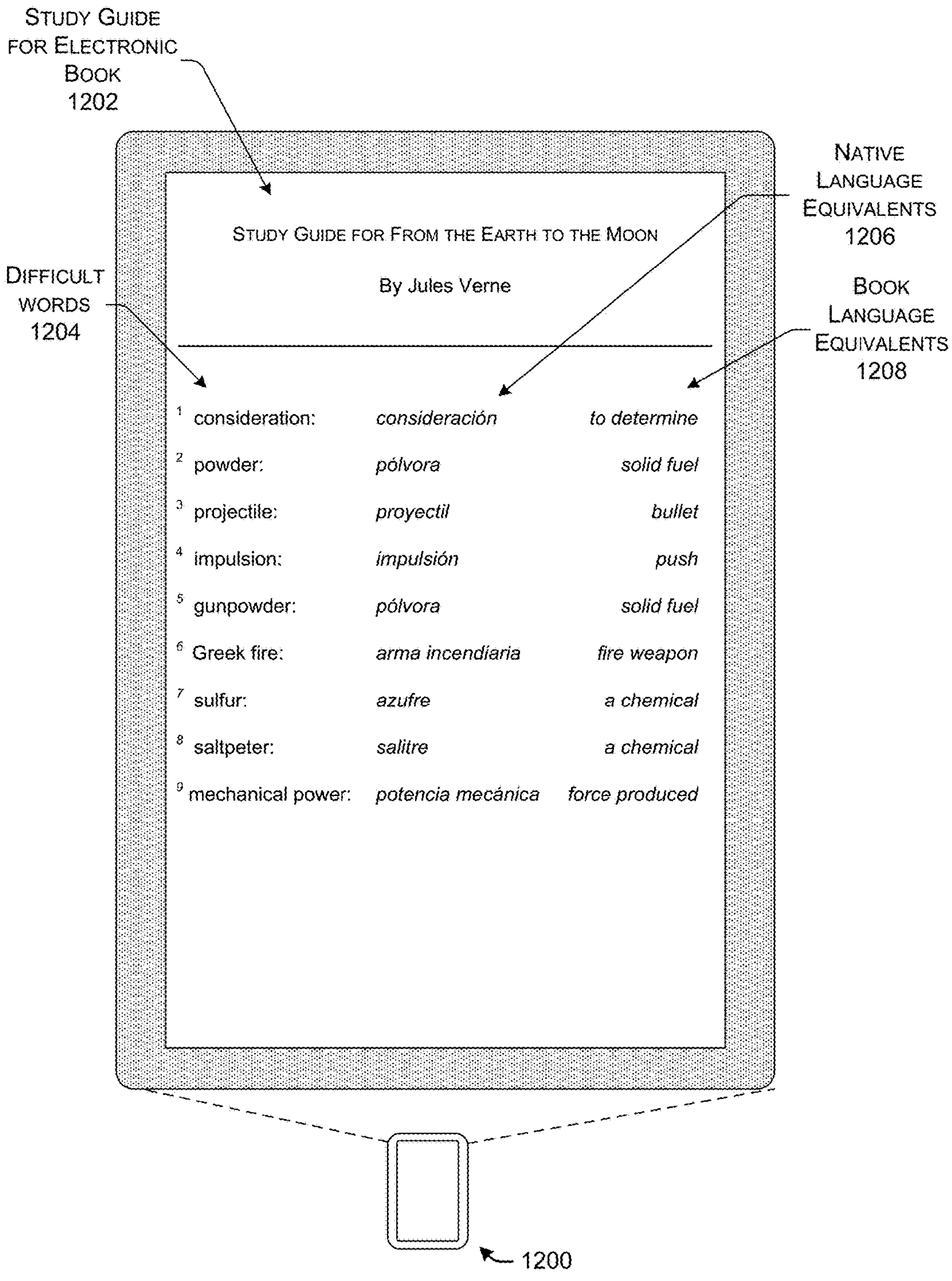
FIGS. 12-13 illustrate two non-limiting examples of alternative or additional uses of comprehension guides determined according to the techniques of disclosed herein. In particular.
Figure 13:
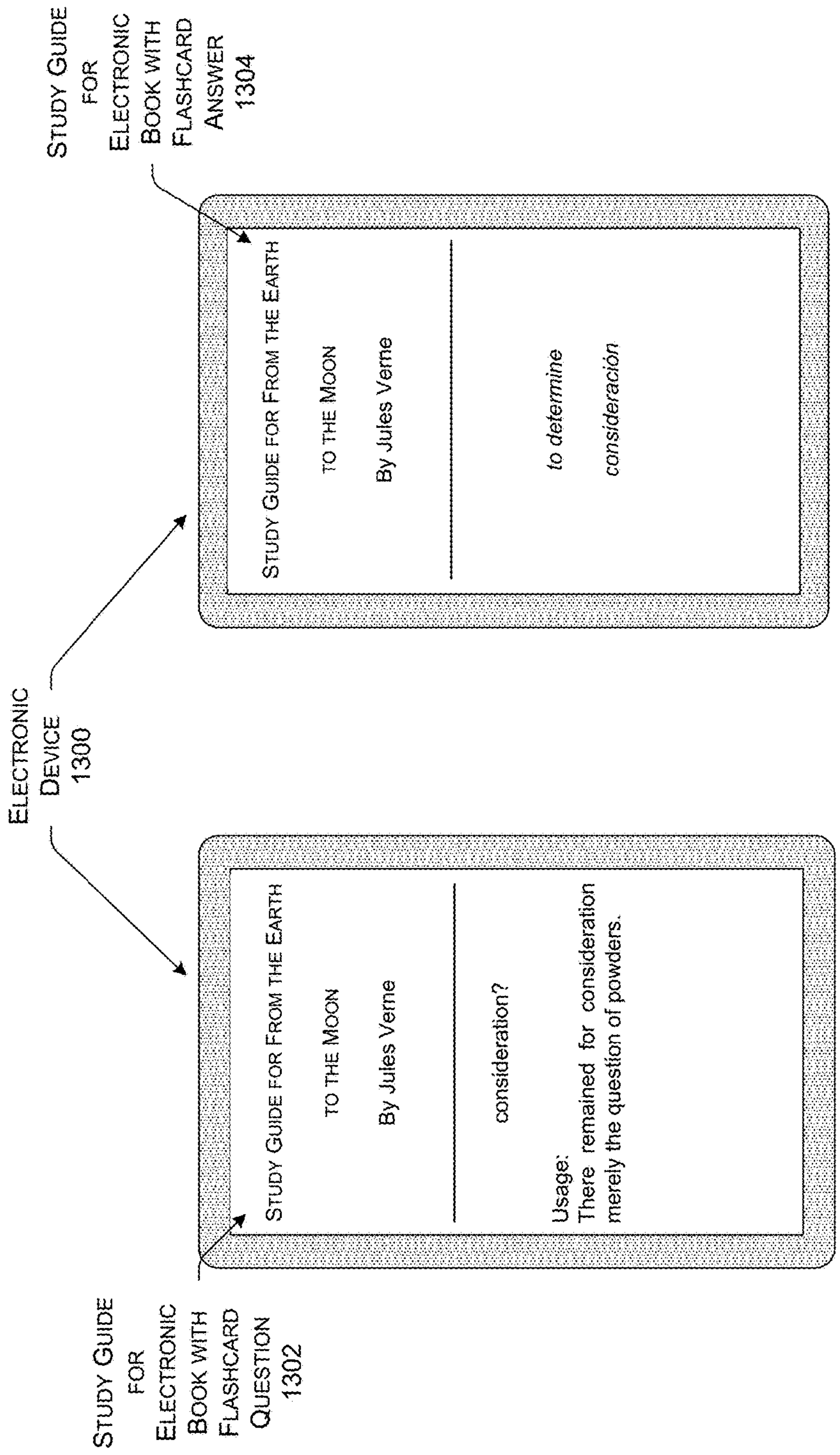

Of course, the examples shown in FIGS. 9-11 are non-limiting and comprehension guides may be utilized in any number of ways. FIGS. 12-13 illustrate two non-limiting examples of alternative or additional uses of comprehension guides determined according to the techniques of disclosed herein. In particular, FIG. 12 illustrates a study guide generated from the difficult words of an electronic book and FIG. 13 illustrates an implementation that utilizes the techniques disclosed herein to generate flash cards for the electronic book.

As mentioned above, FIG. 12 illustrates an implementation in which a device 1200 presents the reader with a study guide 1202 of words and comprehension guides for an electronic book according to the techniques disclosed herein. In particular, in addition or as an alternative to presenting comprehension guides in the text of the eBook as the reader reads the eBook, the servers 312 or the reader's device may select the most difficult words of the eBook and create a study guide 1202 for review by the reader. In the illustrated example, the study guide includes three columns including a column for the difficult words 1204, a column including the reader's native language equivalent of the corresponding difficult word 1206 and a column including book language equivalents of the difficult word that is of a lower difficulty or reading level 1208. Such a study guide may be presented for the reader before or after the eBook is purchased. For example, the reader may wish to review the study guide 1202 prior to purchasing the eBook to determine whether the reader's reading level is sufficient for comprehension of the book. On the other hand, the reader may wish to review the study guide after the purchase of the electronic book, such as to review the difficult terminology in a book when the reader has stopped reading the electronic book for an extended period of time.

FIG. 13 illustrates an electronic device 1300 displaying another form of study guide called flashcards. In particular, the study guide 1302 is illustrated as showing a difficult word and a sentence in which the difficult word is used. The reader may then make an input to be shown the study guide 1304 which includes a book language equivalent of the difficult word and a translation into the reader's native language.

In some implementations, the study guides shown in FIGS. 12 and 13 may be utilized beyond the context of a particular eBook. For example, the study guides may include difficult words from several eBooks and other words for which the reader has made look up requests. The same selection techniques utilized to determine which words of a book should be presented with comprehension guides may also be utilized to determine which of the difficult words of several eBooks should be included in the reader's study guide. For example, the determination may be made based at least in part on general rankings of the words, contextual rankings and one or more aspects of the reader. More particularly, the contextual importance of a word which the reader looked up which is also related to the reader's job industry may be given a relatively high priority for inclusion in the reader's study guide and/or flashcards. The determination of what words to include may also be based on other factors, such as the number of times the word has been shown in the study guides of the user previously.

It should be noted that the processes described above to determine a priority of words for presentation with comprehension guides and the content of the guides may be utilized to perform other tasks. For example, rather than or in addition to presenting some words of the book with comprehension guides, some implementations may replace words or the text that would otherwise be presented with comprehension guides with content determined using the above described processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:

an electronic device having one or more processors; and memory, storing instructions that, when executed on the one or more processors, cause the one or more processors to perform acts comprising:

determining a score for a word included in an electronic book, the score indicative of a priority for presentation of a comprehension guide for the word, the comprehension guide including textual content aiding in comprehension of the word, wherein the determining the score is based at least in part on:

a difficulty value of the word, the difficulty value being based at least in part on a frequency of occurrence of the word in a corpus of writings; and a contextual importance of the word within at least one of the electronic book or a subject matter area associated with the electronic book;

selecting a particular occurrence of the word in the electronic book to be presented with the comprehension guide based at least in part on:

the score of the word;

a number of occurrences of the word in the electronic book; a number of meanings of the word occurring in the electronic book; and a density of occurrences of other words selected to be presented with corresponding comprehension guides;

determining which of a plurality of meanings of the word is used for the particular occurrence of the word in the electronic book;

selecting the comprehension guide for the particular occurrence of the word;

determining a placement location of the comprehension guide proximate to an original location of the particular occurrence of the word in the electronic book, the placement location being selected to avoid concealing existing text in the electronic book;

determining a reading level associated with a reader of the electronic book based at least in part on a dynamically modified guide profile of the reader; and based at least in part on the score of the word, additional scores determined for additional words in the electronic book, and the reading level associated with the reader, dynamically selecting a subset of words in the electronic book to render with corresponding first comprehension guides such that remaining words in the electronic book that are not included in the subset of words are to be rendered without corresponding second comprehension guides, wherein the word is included in the subset of words; and causing display of the comprehension guide at the placement location in the electronic book.

2. The system as recited in claim 1, the selecting configured to select the comprehension guide based at least in part on one or more of the density of occurrences of other words selected to be presented with corresponding comprehension guides or a space available adjacent to the word as displayed in the electronic book such that the comprehension guide is placed on a same line as the word.

3. The system as recited in claim 1, wherein the word has two or more meanings in a first language that are used in the electronic book and wherein the determining the score comprises determining a first score for the word for a first meaning of the word and determining a second, different score for the word for a second meaning of the word, the first score or the second score used in the selecting the particular occurrence of the word in the electronic book.

4. A method comprising:

under control of an electronic device that is configured with executable instructions, determining a score for a word in an electronic book, the score indicative of a priority for presentation of a comprehension guide for the word in the electronic book, the comprehension guide including textual content aiding in comprehension of the word, wherein the determining is based at least in part on:

a difficulty value of the word, the difficulty value being based at least in part on a frequency of occurrence of the word in a corpus of writings; and a contextual importance of the word, the contextual importance being based at least in part on a subject matter area of the electronic book;

selecting the comprehension guide for the word;

determining a placement location of the comprehension guide proximate to an original location of the word in the electronic book, the placement location being selected to avoid concealing existing text in the electronic book;

determining a reading attribute associated with a reader of the electronic book based at least in part on a dynamically modified guide profile of the reader;

based at least in part on the score determined for the word, additional scores determined for additional words in the electronic book, and the reading attribute associated with the reader, dynamically selecting a subset of words in the electronic book to render with corresponding first comprehension guides such that other words in the electronic book that are not included in the subset of words are to be rendered without corresponding second comprehension guides, wherein the word is included in the subset of words; and causing display, on a display of the electronic device, of the comprehension guide at the placement location in the electronic book.

5. The method as recited in claim 4, wherein the word is of a first language, and wherein the comprehension guide comprises one or more of:

a synonym of the word in the first language;

a translation of the word into a second language; or an origin or root of the word that indicates a meaning of the word.

6. The method as recited in claim 4, wherein the determining the score is further based at least in part on the reading attribute, the reading attribute comprising at least one of:

a reading level of the reader;

a reading history of the reader; or a primary language of the reader.

7. The method as recited in claim 4, further comprising presenting the comprehension guide and the word in a study guide based at least in part on the score.

8. The method as recited in claim 4, wherein the word is of a first language and the contextual importance is based at least in part on a frequency with which the word occurs in a corpus of writings in the first language related to the subject matter area.

9. The method as recited in claim 4, further comprising:

causing display, on the display of the electronic device, of the existing text, the comprehension guide, and a second comprehension guide such that the comprehension guide and the second comprehension guide do not overlap on the display;

receiving user input requesting to modify a displayed format of the existing text;

determining that the comprehension guide and the second comprehension guide will overlap on the display after modification of the displayed format of the existing text;

determining a replacement comprehension guide to replace at least one of the comprehension guide or the second comprehension guide, the replacement comprehension guide being selected to avoid rendering overlapping comprehension guides on the display;

modifying the displayed format of the existing text as modified existing text; and causing display, on the display, of the modified existing text and the replacement comprehension guide in lieu of displaying at least one of the comprehension guide or the second comprehension guide such that the replacement comprehension guide does not overlap with a remaining one of the comprehension guide or the second comprehension guide on the display.

10. The method as recited in claim 4, wherein:

the word is a compound word or idiom comprising a plurality of terms, the compound word or idiom having a meaning that is different from a literal meaning of the plurality of terms; and the determining the score of the word comprises determining a score for the compound word or idiom.

11. The method as recited in claim 4, wherein the word is of a first language and the determining the score is further based at least in part on a relation of the first language to a second language.

12. The method as recited in claim 4, further comprising:

receiving feedback from one or more users about the comprehension guide for the word; and adapting the score of the word based at least in part on the feedback.

13. The method as recited in claim 4, wherein the word is of a first language and the determining the score is based at least in part on the word having two or more meanings in the first language.

14. The method as recited in claim 4, wherein the placement location includes at least one of a position interlinearly above a selected occurrence of the word or a position inline adjacent to the selected occurrence of the word.

15. The method as recited in claim 4, further comprising:

determining a definition of the word; and reducing a length of the definition by removing at least one alternative or modifier from the definition.

16. One or more non-transitory computer-readable media storing computer-executable instructions that, when executed on an electronic device having one or more processors, cause the one or more processors to perform acts comprising:

determining a score for a word of an electronic book indicative of a priority for presentation of a comprehension guide for the word, the comprehension guide including textual content aiding in comprehension of the word, wherein the determining is based at least in part on:

a difficulty value of the word based at least in part on a frequency of occurrence of the word in a corpus of writings; and a contextual importance of the word within the electronic book;

selecting the comprehension guide for presentation with the word;

determining a placement location of the comprehension guide proximate to an original location of the word in the electronic book, the placement location being selected to avoid concealing existing text in the electronic book;

determining a reading attribute associated with a reader of the electronic book based at least in part on a dynamically modified guide profile of the reader; and based at least in part on the score determined for the word, additional scores determined for additional words in the electronic book, and the reading attribute associated with the reader, dynamically selecting a subset of words in the electronic book to render with corresponding first comprehension guides such that other words in the electronic book that are not included in the subset of words are to be rendered without corresponding second comprehension guides, wherein the word is included in the subset of words; and causing display of the comprehension guide at the placement location in the electronic book.

17. The one or more non-transitory computer-readable media as recited in claim 16, wherein the contextual importance of the word is based at least in part on a frequency with which the word occurs in the electronic book.

18. The one or more non-transitory computer-readable media as recited in claim 16, wherein the contextual importance of a word is based at least in part on the word having two or more meanings in a first language.

19. The one or more non-transitory computer-readable media as recited in claim 16, wherein the reading attribute includes at least one of:

a reading level of the reader;

a reading history of the reader; or a primary language of the reader.

20. The one or more non-transitory computer-readable media as recited in claim 16, wherein the determining the score is further based at least in part on a relation of a first language to a second language, where the second language is a native language of the reader.

21. The one or more non-transitory computer-readable media as recited in claim 16, wherein the determining the score of the word is based at least in part on the word having two or more meanings in a first language that are present in the electronic book.

* * * * *